US007099782B2

(12) United States Patent
Hitchcock et al.

(10) Patent No.: US 7,099,782 B2
(45) Date of Patent: Aug. 29, 2006

(54) VIBRATION ANALYSIS FOR PREDICTIVE MAINTENANCE IN MACHINERY

(75) Inventors: Leith Patrick Hitchcock, Pinkenba (AU); Nicholas Schmitz, Newport (AU)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/483,438

(22) PCT Filed: Jul. 8, 2002

(86) PCT No.: PCT/EP02/07643

§ 371 (c)(1),
(2), (4) Date: May 24, 2004

(87) PCT Pub. No.: WO03/006935

PCT Pub. Date: Jan. 23, 2003

(65) Prior Publication Data

US 2004/0199348 A1 Oct. 7, 2004

(30) Foreign Application Priority Data

Jul. 9, 2001 (EP) .................................. 01305889

(51) Int. Cl.
*G01F 17/00* (2006.01)
*G01H 1/08* (2006.01)
*G01H 17/00* (2006.01)

(52) U.S. Cl. ............................ 702/56; 73/593; 73/570; 73/598

(58) Field of Classification Search ............... 702/56, 702/33, 34; 73/593, 570, 597, 598
See application file for complete search history.

(56) References Cited

U.S. PATENT DOCUMENTS 5,501,105 A 3/1996 Hernandez et al.
5,533,400 A * 7/1996 Gasch et al. .................. 73/593

FOREIGN PATENT DOCUMENTS

EP 0 899 553 3/1999

OTHER PUBLICATIONS

International Search Report dated Sep. 13, 2002.
Lipowczan A et al: "A multichannel monitoring system based upon vibration signal processing for mine-shaft installation" Measurement. Jan.-Mar. 1991. UK. vol. 9 No. 1, pp. 10-12.
Weck M et al: "Schadenserkennung An Hochbelasteten Getrieben", VOI Z. VDI Verlag GMBH. Dusseldorf, DE, No. Special, Apr. 1, 1993 pp. 14-18, p. 15, left-hand column: figures 2,3.
PCT International Preliminary Examination Report. International Application No. PCT/EP02/07643. dated Jun. 30, 2003.

* cited by examiner

*Primary Examiner*—Bryan Bui
*Assistant Examiner*—Meagan S Walling

(57) ABSTRACT

A method for detecting vibration signatures in a reversible drive is disclosed. The method includes the steps of acquiring digital data representative of vibrations in the reversible drive and identifying and grouping together portions of data in a plurality of groups. The identified portions of data relate to a particular direction of travel of the reversible drive and the plurality of groups relate to travel in different directions of the reversible drive. The method can include the further step of processing at least one of the groups of data using signal processing techniques. A system and computer program product for practicing the method for detecting vibration signatures in a reversible drive are also disclosed.

18 Claims, 22 Drawing Sheets

VIBRATION ANALYSIS FOR PREDICTIVE MAINTENANCE IN MACHINERY

FIELD OF THE INVENTION

The present invention relates generally to vibration analysis in machinery and more specifically to vibration analysis, for purposes of predictive maintenance, in rotating, reciprocating and cyclic machinery.

BACKGROUND OF THE INVENTION

Predictive maintenance aims to sustain the availability of equipment and avoid catastrophic failures, which may cause severe consequential damage to other components of the equipment before the equipment can be shut down. The avoidance of catastrophic failures often reduces the number of components to be replaced. Predictive maintenance is further beneficial in that equipment down time can be predicted and scheduled. Thus, unscheduled down time can be minimised and delays that may be incurred due to procurement of spare parts can be avoided.

Rotating and reciprocating machinery represent very commonly found types of equipment found in industry and it is for this reason that extensive work has been conducted on techniques to aid predictive maintenance programs on such equipment, including vibration analysis, infra-red thermography and oil analysis.

Two known techniques used in vibration analysis include Time Synchronous Averaging (TSA) and Order Tracking. Both techniques are used in conjunction with a conventional Fast Fourier Transform (FFT) to produce a frequency spectrum of the vibration data for analysis to detect vibration signatures indicative of actual or potential fault conditions.

Various vibration analysis techniques are well documented and have a proven record in predicting catastrophic failures. However, an area that has attracted little attention is that of the analysis of frequently reversing drives, particularly such as found in rotating and reciprocating machinery. No techniques are currently known for the successful analysis of equipment vibrations whilst that equipment is accelerating or decelerating and/or for differentiation between vibration signatures in the forward and reverse directions. One reason is that system dynamics change with speed, direction, and more importantly, with load. Another reason for the limited analysis of frequently reversing drives is that the period during which the equipment runs at a constant speed is normally insufficient for vibration analysis to be performed.

A need thus exists for a vibration analysis technique that can be applied to frequently reversing, rotating, reciprocating and cyclic machinery. Draglines, shovels, winders and cranes, are just some examples of rotating and reciprocating machinery that would clearly benefit from a successful predictive maintenance strategy incorporating advanced vibration analysis techniques such as TSA and Order Tracking.

SUMMARY OF THE INVENTION

According to a first aspect of the present invention, there is provided a method for detecting vibration signatures in a reversible drive, the method including the steps of:
  acquiring digital data representative of vibrations in the reversible drive;
  identifying portions of the data using a processor means; and
  grouping together the identified portions of data in a plurality of groups;
  wherein each of the identified portions of data relate to travel in a particular direction of travel of the reversible drive and the plurality of groups relate to different directions of travel of the reversible drive.

According to a further aspect of the present invention, there is provided a system for detecting vibration signatures in a reversible drive, including:
  transducer means for acquiring digital data representative of vibrations in the reversible drive;
  processor means for identifying portions of the data; and
  processor means for grouping together the identified portions of data in a plurality of groups;
  wherein each of the identified portions of data relate to travel in a particular direction of travel of the reversible drive and the plurality of groups relate to different directions of travel of the reversible drive.

According to a further aspect of the present invention, there is provided a computer program product having a computer readable medium having a computer program recorded therein for detecting vibration signatures in a reversible drive, including:
  computer program code means for acquiring digital data representative of vibrations in the reversible drive;
  computer program code means for identifying portions of the data; and
  computer program code means for grouping together the identified portions of data in a plurality of groups;
  wherein each of the identified portions of data relate to travel in a particular direction of travel of the reversible drive and the plurality of groups relate to different directions of travel of the reversible drive.

According to an embodiment of the present invention, the identified portions of data are representative of substantially constant speed of operation of the reversible drive. The digital data may include data sampled at either a fixed time interval sampling rate or a variable sampling rate synchronised to the speed of the drive. Data sampled at a fixed time interval sampling rate can be resampled such that each successive sample of the resampled data corresponds to a successive position of the reversible drive and the distance between each of the successive portions is a constant amount. The distance may be an angular distance.

Preferably, each successive sample of each group of identified portions of data corresponds to a successive sample position of the reversible drive.

Preferably, at least one of the groups of identified portions of data are processed to produce data representative of one or more vibration signatures. The processing step may include one or more of the following:
  accumulating the average, in the time domain, of the data comprising one of the groups;
  accumulating the average, in the angle domain, of the data comprising one of the groups;
  accumulating the average, in the frequency domain, of the data comprising one of the groups;
  accumulating the average, in the orders domain, of the data comprising one of the groups;
  computing a time synchronised average time waveform of the data comprising one of the groups;
  computing a frequency spectrum of a time synchronised average of the data comprising one of the groups;
  computing an order tracked frequency spectrum of the data comprising one of the groups;
  computing the kurtosis of an accumulated time domain average;

computing the kurtosis of an accumulated angle domain average;

computing the kurtosis of a time synchronised average time waveform; and computing a demodulated frequency spectrum of the data comprising one of the groups.

According to a further aspect of the present invention, there is provided a method for detecting vibration signatures in a rotating and/or cyclic machinery, which method includes the steps of:

acquiring digital data representative of vibrations in the machinery, wherein the data includes data acquired at different speeds of the machinery;

identifying portions of the data relating to a predetermined speed and acceleration range of the machinery and for identifying portions of the data outside the predetermined speed and acceleration range, wherein a processor means is used for identifying the portions of the data; and grouping together the identified portions of data relating to the predetermined speed and acceleration range in a group relating to data in the predetermined speed and acceleration range, by appending successive portions to an accumulation of previous data portions also relating to the predetermined speed and acceleration range.

According to a further aspect of the present invention, there is provided a system for detecting vibration signatures in a rotating and/or cyclic machinery according to the method of claim 13, which system includes:

transducer means for acquiring digital data representative of vibrations in the machinery;

processor means for identifying portions of said data relating to a predetermined speed and acceleration range of the machinery and for identifying portions of the data outside the predetermined speed and acceleration range; and processor means for grouping together said identified portions of data relating to the predetermined speed and acceleration range in a group relating to data in the predetermined speed and acceleration range by appending successive portions to an accumulation of previous data portions also relating to the predetermined speed and acceleration range.

According to a further aspect of the present invention, there is provided a computer program product having a computer readable medium having a computer program recorded therein for detecting vibration signatures in a rotating and/or cyclic machinery for use in the method according to claim 13, wherein the computer program product includes:

computer program code means for acquiring digital data representative of vibrations in the machinery;

computer program code means for identifying portions of said data relating to a predetermined speed and acceleration range of the machinery and for identifying portions of the data outside the predetermined speed and acceleration range; and computer program code means for grouping together said identified portions of data relating to the predetermined speed and acceleration range in a group relating to data in the predetermined speed and acceleration range by appending successive portions to an accumulation of previous data portions also relating to the predetermined speed and acceleration range.

BRIEF DESCRIPTION OF THE DRAWINGS

Features and preferred embodiments of the present invention are hereinafter described with reference to the accompanying drawings, in which.

DETAILED DESCRIPTION OF THE INVENTION

Figure 1:
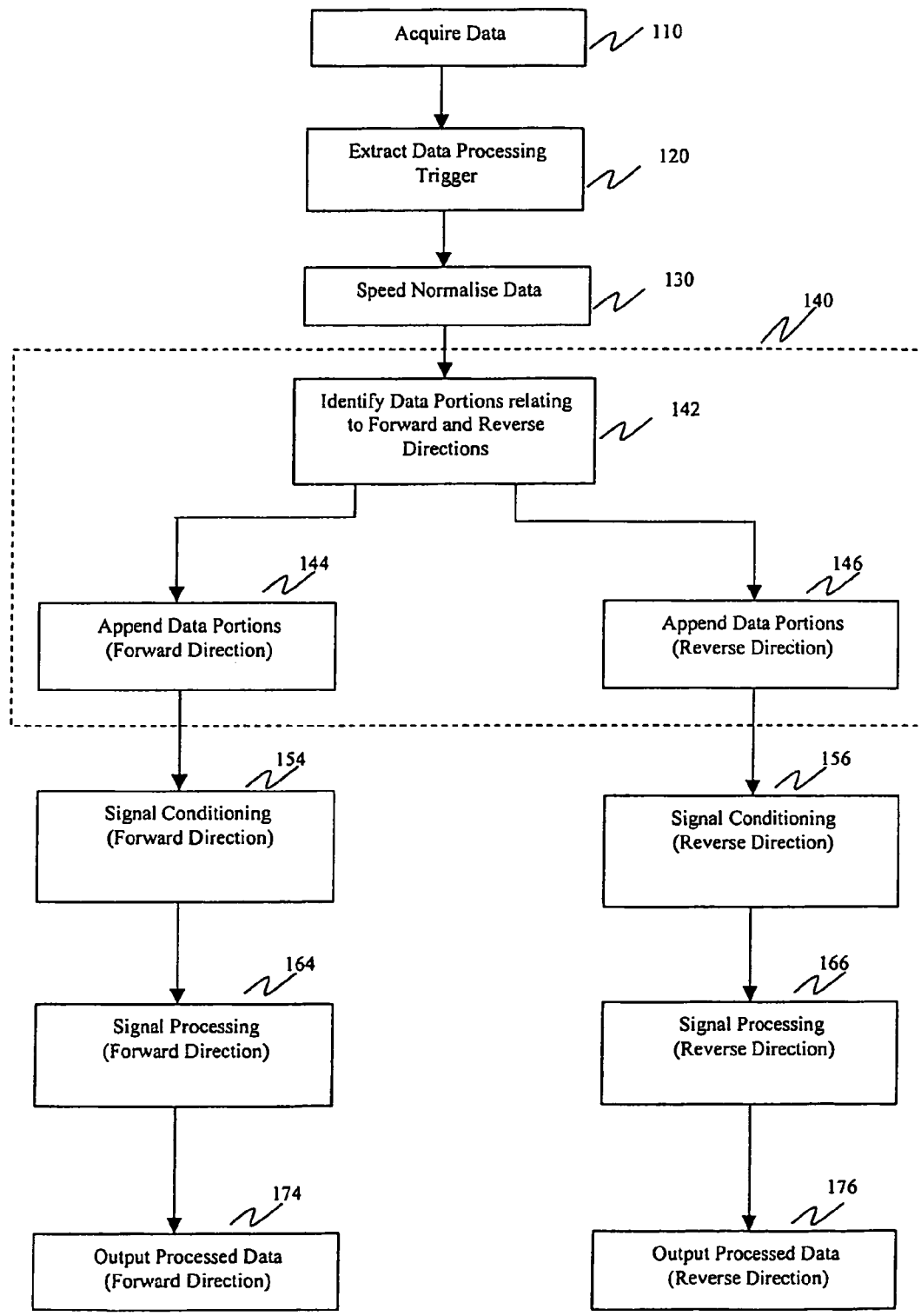
FIG. 1 is a flow diagram showing a method of vibration analysis for application to a reversible drive.

A method, an apparatus and a computer program product for vibration analysis in machinery are disclosed hereinafter. The principles of the method, apparatus and computer program product, in accordance with embodiments of the invention, have general applicability to rotating and/or cyclic machinery that typically incorporates reversible drives. However, it is not intended that the present invention be limited to the described method, apparatus and computer program product. For example, aspects of the invention have application to variable speed drives that have multiple settings of constant speed and to drives of varying speed wherein the analysis includes periods of acceleration and deceleration of such drives. Aspects of the invention also have application to equipment that changes direction in a number of different orientations. For example, the equipment may move left, right, up, down, forwards and backwards. A reversible drive is defined as a piece of equipment that contains one or more elements that change direction in either a linear, angular or rotational manner.

In a preferred embodiment of the system of the present invention, said identified portions of data are representative of substantially constant speed of operation of said reversible drive.

In the system of the present invention, said digital data preferably includes data sampled at a variable sampling rate synchronised to the speed of said reversible drive.

In another embodiment of the system of the present invention, said digital data includes data sampled at a fixed time interval sampling rate.

In a preferred embodiment of the system of the present invention, said system further includes processor means for resampling said digital data, wherein each successive sample of the resampled digital data corresponds to a successive position of said reversible drive and the distance between each of said successive positions is a constant amount.

Preferably, in the system of the present invention, each successive sample of each of said one or more groups of identified portions of data corresponds to a successive sample position of said reversible drive.

In another preferred embodiment of the system of the present invention, said system further includes processor means for processing at least one of said groups of identified portions of data to produce data representative of one or more vibration signatures.

Said processor means includes one or more processor means selected from the group consisting of:

processor means for accumulating the average, in the time domain, of the data comprising one of said groups;

processor means for accumulating the average, in the angle domain, of the data comprising one of said groups;

processor means for accumulating the average, in the frequency domain, of the data comprising one of said groups;

processor means for accumulating the average, in the orders domain, of the data comprising one of said groups;

processor means for computing a time synchronised average time waveform of the data comprising one of said groups;

processor means for computing a frequency spectrum of a time synchronised average of the data comprising one of said groups;

processor means for computing an order tracked frequency spectrum of the data comprising one of said groups;

processor means for computing the kurtosis of an accumulated time domain average;

processor means for computing the kurtosis of an accumulated angle domain average;

processor means for computing the kurtosis of a time synchronised average time waveform; and processor means for computing a demodulated frequency spectrum of the data comprising one of said groups.

In one embodiment of the computer program product of the present invention, said identified portions of data are representative of substantially constant speed of operation of said reversible drive.

In a further embodiment of the computer program product of the present invention, said digital data includes data sampled at a variable sampling rate synchronised to the speed of said reversible drive.

In another embodiment of the computer program product of the present invention, said digital data includes data sampled at a fixed time interval sampling rate.

The computer program product of the present invention, may further include computer program code means for resampling said digital data, wherein each successive sample of the resampled digital data corresponds to a successive position of said reversible drive and the distance between each of said successive positions is a constant amount.

In a further embodiment of the computer program product of the present invention, each successive sample of each of said one or more groups of identified portions of data corresponds to a successive sample position of said reversible drive.

In one embodiment, the reversible drive changes its direction of travel (such as its direction of rotation) while the data is acquired.

In another embodiment of the computer program product of the present invention, the computer program product further includes computer program code means for processing at least one of said groups of identified portions of data to produce data representative of one or more vibration signatures.

Said computer program code means includes one or more computer program code means selected from the group consisting of:

computer program code means for accumulating the average, in the time domain, of the data comprising one of said groups;

computer program code means for accumulating the average, in the angle domain, of the data comprising one of said groups;

computer program code means for accumulating the average, in the frequency domain, of the data comprising one of said groups;

computer program code means for accumulating the average, in the orders domain, of the data comprising one of said groups;

computer program code means for computing a time synchronised average time waveform of the data comprising one of said groups;

computer program code means for computing a frequency spectrum of a time synchronised average of the data comprising one of said groups;

computer program code means for computing an order tracked frequency spectrum of the data comprising one of said groups;

computer program code means for computing the kurtosis of an accumulated time domain average;

computer program code means for computing the kurtosis of an accumulated angle domain average;

computer program code means for computing the kurtosis of a time synchronised average time waveform; and computer program code means for computing a demodulated frequency spectrum of the data comprising one of said groups.

Directional Normalisation

For the successful analysis of vibrations in reversible drives, it is advantageous that samples in the forward and reverse directions are separated and processed individually. This is due to the existence of differing speed and loading conditions in the forward and reverse directions. For the specific case of gears, different teeth faces are in contact when moving or rotating in different directions.

A fundamental limitation in vibration analysis of reversing drives is the time available to collect data in a particular direction before the drive reverses. A solution that permits data acquisition whilst the equipment is in commercial operation is to separate the samples collected into the forward and reverse directions and then group together all the samples collected for each direction of travel. This process is referred to as "directional normalisation". For the case of equipment that changes direction in a number of different orientations, the data is direction normalised into each direction or orientation separately.

Speed Variations and Fluctuation

It is also necessary to detect the rotational speed of the shaft of interest and normalise speed fluctuations. Minor speed fluctuations are of minimal effect, provided that the data is sampled in or transformed into the angle domain. TSA and Order Tracking require a fixed number of samples per revolution, in the angle domain, so that each sample corresponds to a specific position on the shaft. If the shaft rotational speed changes, and the data is collected in the time domain, the frequency spectrum shows smeared spectral components, particularly for the higher shaft orders. On the other hand, a frequency spectrum of data collected in the angle domain will maintain sharp peaks irrespective of fluctuations in speed. Smearing of spectral components occurs because the data samples collected in the time domain do not correspond to a specific position on the shaft that is generating the vibration, but rather to a time from the beginning of the shaft rotation.

The foregoing description concerns TSA performed on rotating machinery by ensuring the data is sampled or transformed into the angle domain. This concept can equally be applied to equipment that moves in any other fashion. Essentially the data must be sampled or transformed into the position domain, where the position relates to a physical point in the cycle rather than a time from the beginning of the cycle. For example if a piece of equipment moves in a linear fashion it would be important that the data is either sampled or transformed into the linear domain such that each sample relates to a specific distance from the beginning of each cycle.

The effects of varying speeds of operation, as opposed to mere speed fluctuations, can be substantially eliminated by the identification and use of constant speed portions of the data. It is particularly beneficial in most cases to use constant speed data because the system dynamics remain the same at a particular speed. However, in some cases, it may be beneficial to analyse data collected during periods of acceleration and/or deceleration. This data can also be speed normalised and/or direction normalised and then processed by means of various techniques.

Data Sampling and Resampling with Interpolation

Two methods of obtaining vibration signals in the angle domain include sampling the data in the angle domain directly, by means of a phase locked frequency multiplier, and resampling of vibration data originally sampled in the time domain.

A phase locked frequency multiplier adjusts the sampling frequency in sympathy with changes in the shaft rotational frequency and attempts to collect the same number of sample points for each revolution of the shaft. The sampling frequency is effectively synchronised with the frequency of the gear rotation to compensate for machine speed increases or decreases. Thus, a sufficient number of equally spaced pulses, in the angle domain, can be generated for each revolution of the gear. The required sampling frequency is determined by the time between the pulses. As the shaft speeds up, and the time between each pulse becomes shorter, the sampling frequency increases at a suitable rate to maintain the same number of data samples per revolution. The phase locked technique can also be applied to situations where the shaft of interest can not be accessed but another shaft in the gear train can. In such a case, a suitable frequency multiplier is selected to produce a pulse train corresponding to the shaft of interest. One potential problem with the phase locked technique is the difficulty of generating more than a few pulses per revolution on equipment in commercial operation because of the shaft of interest not being easily accessible and there being an insufficient number of revolutions of an appropriately accessible shaft. Thus, it is best to incorporate the device at the design stage. Furthermore, if changes in speed occur too quickly, the phase detector may not be able to track the changes in shaft speed fast enough. The time lag that results when changes in frequency or phase occur creates errors that limit the accuracy of the averaged time signal. Other potential disadvantages include susceptibility to false triggering and a finite time necessary to lock on to the input signal that can often be too long. The result is that only a small proportion of a large number of samples can be used for time synchronous averaging. This is further exacerbated for the case of reversing machinery with a particularly short cycle time.

A simpler and more accurate method of allowing for variations in rotational speed is to digitally resample the data acquired at a fixed sampling rate so that each sample corresponds to a specific angular position on the shaft of interest. This effectively results in a variable sampling rate that changes with changes in the rotational speed of the shaft to ensure a fixed number of sample points for each revolution of the shaft. An advantage is that this method does not require additional hardware apart from a standard data acquisition device that samples at a constant rate and a digital computer to post process and resample the data. Resampling of the data can occur as data is acquired (i.e. online, with the use of buffering) or offline. Offline resampling allows more time for filtering and processing to remove interference and noise in the signal. An advantage of offline resampling is that more recorded data can be processed and more revolutions can be used in the averaging process. The major advantage of this method is the ease with which the pulse sequence can be manipulated to perform an average on a hidden shaft. Simple linear interpolation can be applied to determine the new arrival times of the pulse train as opposed to complex loop filters required for the phase locked loop frequency multiplier.

It is imperative that the spectral characteristics, which describe the dynamic nature of the signal, are preserved in the conversion from the time domain to the angle domain. This can be achieved by using linear interpolation to determine the desired time from the reference pulse to each desired sample, which is a suitable method, provided the function being interpolated is highly band limited. Together with the desired resample times (corresponding to specific angle positions), interpolation techniques are used to resample the vibration data. There are a number of different interpolation techniques that can be applied. Increasing the order of interpolation decreases the amplitude of side lobes, thus producing a better stop band performance, a flatter pass band, and a sharper cut off rate. The cubic function provides a good frequency response, although the higher order increases computation times.

Signal Processing

A number of different known signal processing techniques can be applied to the vibration signal(s) after they have been directionally normalised and/or speed normalised. Time synchronous averaging (TSA), Order Tracking and Demodulation are some of the techniques applied to the directionally normalised data. It will be apparent to those skilled in the art that variations to the processing of appended or grouped directionally normalised data can be made without departing from the scope and spirit of the invention. In particular any known signal processing techniques may be used in conjunction with or in addition to those described herein.

Time Synchronous Averaging (TSA)

Time Synchronous Averaging produces a cumulative average of a signal in the angle domain. The technique can also be applied to produce a cumulative average of a signal in either the time domain or the position domain. It is preferable to sample or resample the signal in the position domain (angle domain for rotating shafts) to ensure that each sample relates to a specific location in the cycle rather than a set time from the beginning of the cycle. If the data is sampled in the time domain and the speed of the drive fluctuates, smearing of the frequency spectrum will occur. However, if the data is sampled or resampled into the position domain, the smearing of the frequency spectrum will be minimised, if not eliminated. TSA requires a reference trigger that is synchronous with the particular cycle being analysed to determine the beginning of each sampling window. The reference trigger may be a single trigger relating to the beginning of every cycle or a multitude of triggers, each relating to a specific position in the cycle. In vibration analysis, TSA enhances the synchronous vibration components, whilst the non-synchronous components and noise are substantially reduced. Isolation of a specific machine component such as an individual roll on a paper machine or a specific shaft in a complex gearbox is thus possible and the effects of external excitation such as forcing frequencies from adjacent machines are minimised. As a consequence, TSA has proved to be successful for detection of repetitive shaft synchronous faults such as shaft cracks, misalignment, unbalance and tooth damage. However, when conducted over one revolution of a shaft, TSA averages out most frequencies associated with bearing faults due to the fact that such faults are not synchronous with the shaft rotation. By comparison, Order Tracking does not remove non-synchronous frequencies and will therefore show bearing faults.

In TSA, uniformly distributed wear (i.e. where the tooth profile remains unmodified) only increases the tooth-meshing frequency, and its harmonics, and does not give rise to side bands. Non-uniformly distributed faults will give rise to components at other frequencies, including low harmonics caused by periodically repeated impulses, and side bands that in turn cause amplitude and frequency modulation to occur. Furthermore, TSA may produce a 'ghost frequency', which is essentially a clean line that appears in the frequency domain after performing a Fast Fourier Transform (FFT) on the time domain data and does not correspond to any known components of the shaft. The 'ghost frequency' is believed to be due to the type of cutter used in the manufacture of gears.

When conducting TSA with an averaging window of one revolution, the frequency spacing between the lines of the spectrum is always the rotational frequency of the shaft, or one order. Thus, the resolution of the spectrum can not be improved by increasing the sample rate—this will only improve the maximum order that can be represented. If a higher resolution is required, the average should be conducted over more revolutions. For example, if a two-revolution window is used for the average, the frequency spacing in the spectrum will be half an order.

Order Tracking

Order Tracking is similar to TSA in that a frequency response analysis of data in the angle domain is involved. However, Order Tracking differs from TSA in that signal averaging occurs in the frequency or orders domain, after transformation of the data by means of an FFT, rather than in the time or angle domain. Order Tracking is different to Order Normalisation in that the analysis is conducted in the angle domain, rather than in the time domain. Order Tracking can successfully detect a multitude of problems, including lubrication problems, unbalance, misalignment and bearing faults. Essentially, Order Tracking can be used in the same way as standard frequency analysis on data collected in the time domain. The main advantages of Order Tracking are that it allows for speed fluctuations and that vibrations are always reported relative to the shaft rotational speed.

In an orders spectrum, orders or harmonic components remain fixed in position despite speed changes or fluctuations. This constitutes a clear advantage when comparing the characteristics of variable speed machines over a period of time. The disadvantage of an orders spectrum is that fixed frequency components can move, thus making it difficult to recognise speed dependent amplitude changes. In particular, as resonance is directly related to shaft speed, the resulting amplitudes will remain fixed in the time domain but not in the angle domain. These frequencies move when plotted on an orders spectrum, whereas, if plotted on a frequency spectrum their position would remain fixed. This is especially obvious in an orders waterfall display.

Demodulation

Modulation is the variation in the value of a parameter which characterises a periodic oscillation. Thus, amplitude modulation of a sinusoidal oscillation is a variation in the amplitude of the sinusoidal oscillation. Phase modulation of a sinusoidal oscillation is a variation in the phase of the sinusoidal oscillation. Amplitude and phase modulation occur in vibration signals from most equipment.

Demodulation is the process of extracting the original modulating signal(s). Consequently, demodulation is necessarily incorporated in the processing of the appended data.

Typically, in vibration analysis, demodulation is used to predict incipient failure in bearings and gears. The most common techniques incorporate band pass filtering and enveloping to assist in the detection of such faults.

The Kurtosis

Calculation of the Kurtosis, otherwise known as the normalised fourth statistical moment, is a useful analysis technique for determination of the condition of a gearbox. The Kurtosis, K, may be calculated using the following formula:

$$K = \frac{[\sum (X_i - M)^4]}{NS^4}$$

where: N=number of samples
M=mean value
S=standard deviation
$X_i$=$i^{th}$ sample The Kurtosis is larger for cases where single large peaks exist, as opposed to a normal gaussian distribution for which a kurtosis of three can be expected. Thus, the Kurtosis can be used as an indication of the extent to which large peaks dominate the time waveform. The actual value should be monitored and compared to the value calculated when the gearbox was new or at least in good condition.

Use of the Kurtosis to detect a fatigue crack in a gearbox has been successfully demonstrated. The Kurtosis was calculated after enhancement of the TSA time waveform by band pass filtering around the dominant gear mesh harmonic and subsequent removal of the meshing harmonic. The resulting time waveform had a distinct peak at the location of the fatigue crack and the Kurtosis value rose from three to around seven.

General Embodiment

FIG. 1 is a flow diagram of a general method of vibration analysis for application to a reversible drive.

Vibration data from a transducer, such as an accelerometer, and shaft speed, direction and position data from one or more transducers, such as a tachometer, are acquired at step 110.

At step 120, a data processing trigger is extracted from the acquired data. The trigger relates to a reference point on the shaft of interest and facilitates further data processing. Specifically, the trigger facilitates identification of portions of the data relating to each direction of travel of the shaft of interest and identification of constant speed data. Determination of the trigger and direction of rotation of the shaft of interest are further described later in this document.

At step 130, the data is speed normalised. This includes resampling of the data for transformation from the time domain into the angle domain. At the same time, samples relating to periods of acceleration and deceleration are identified and eliminated from the data. Both resampling and determination of constant speed data are further described later in this document.

Steps 142, 144 and 146 constitute the process of direction normalisation. At step 142, portions of the speed normalised data in the angle domain, relating to the forward and reverse directions, are identified. Then, at step 144, successive portions of data relating to the forward direction are grouped together by appending successive portions to an accumulation of previous data portions also relating to the forward direction. Similarly, at step 146, successive portions of data relating to the reverse direction are grouped together by appending successive portions to an accumulation of previous data portions also relating to the reverse direction. The portions of data are grouped in such a way that the first sample of each successive portion appended corresponds to the position of the reversible drive immediately following the position of the reversible drive corresponding to the last sample of the data portion last appended.

At steps 154 and 156, the data grouped in the forward and reverse directions, respectively, undergoes signal conditioning. Signal conditioning of the data is performed to eliminate the effects of aliasing and spectral leakage. During resampling, the number of samples is increased relative to the number of original samples (i.e. upsampling using cubic interpolation). A digital low-pass filter is thus applied to the data to remove any frequencies above those that can be accurately represented by data sampled at the original sampling rate, in accordance with the Nyquist criterion. However, aliasing errors due to resampling will be attenuated by the time synchronous averaging process. The resampled waveform is filtered by a low pass $9^{th}$ order Butterworth filter to remove frequencies above half the original sampling frequency, thus avoiding errors due to aliasing.

Leakage occurs when performing a Fast Fourier Transform (FFT) and is due to the fact that the data is sampled over a finite time period and the frequency components are cut in mid-cycle. Leakage is reduced by the technique known as windowing the signal. Windows used include Hanning, Hamming, seven Term B-Harris, four Term B-Harris, Flat Top, Blackman, Exact Blackman and Blackman-Harris.

At steps 164 and 166, the data accumulated in the respective directions undergoes signal processing. The signal processing typically comprises standard vibration analysis techniques. One technique of analysis involves averaging the filtered time waveform in the time domain to produce a Time Synchronised Average. Then, an orders FFT is computed on the digital TSA time waveform, thus identifying the spectrum of frequencies that are integer multiples of shaft rotation frequency. The Kurtosis can also be computed, using the data of the digital TSA time waveform.

Another technique of analysis involves use of the resampled data to produce an Order Tracked spectrum that is averaged in the frequency domain. This requires transformation of the data to the frequency domain, by means of an FFT, prior to signal averaging.

At steps 174 and 176, the data processed in the forward and reverse directions, respectively, is output to a display monitor or printer for human visual analysis. The interpretation of vibration signals is a highly skilled art that requires extensive machinery knowledge and a detailed understanding of mechanical vibrations. Certain known correlations can be applied to predict incipient failures. For example, a specific type of fault condition may be identifiable by a specific vibration signature. Furthermore, the extent of existing damage may be related to the magnitude of one or more specific frequency components.

However, it will be apparent to those skilled in the art that variations to the manner of output of the processed data can be made without departing from the scope and spirit of the invention. For example, the processed data may undergo further processing to facilitate classification of predefined fault conditions by machine-based correlation of acquired vibration signatures with stored vibration signatures, where characteristics of the stored signatures are representative of specific fault conditions.

The further processed data can be used to provide alarm levels by means of visual and/or audible indicators. The alarm levels can be categorised into warning, danger and shutdown categories. The shutdown category may be the level at which the machine is automatically shutdown to avoid catastrophic failure.

Direction and Trigger Determination

Figure 2:
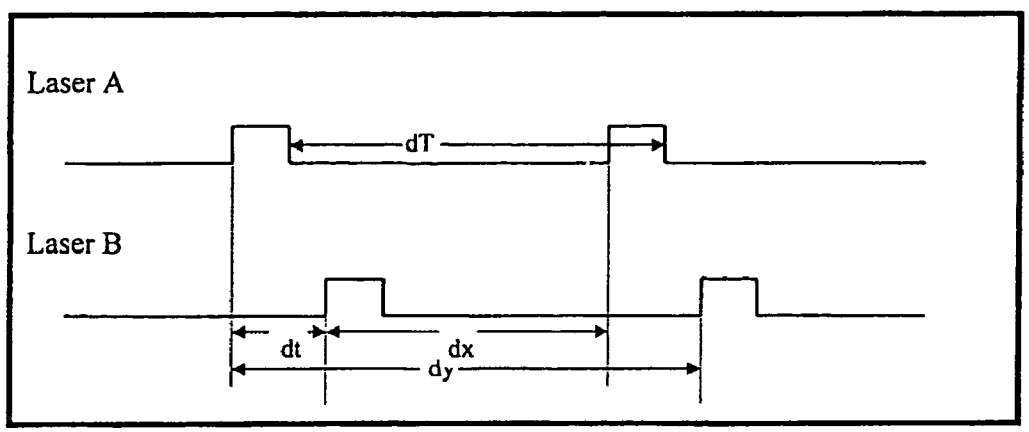
FIG. 2 is a timing diagram showing determination of the direction of rotation and trigger point of a shaft of interest, according to embodiments of the invention.

FIG. 2 shows determination of the direction of rotation and trigger point of a reference shaft. Two laser tachometers are used to generate a square pulse once every revolution by detection of a key way, a marking, or a piece of reflective tape on the reference shaft. The two laser tachometers are offset from each other by an angle of approximately 60 degrees. The specific angle is not critical, however, the offset must be sufficient to eliminate false triggering due to reflections from the other laser but less than 180 degrees. The laser tachometers are each connected to separate channels on a data acquisition card in a personal computer (PC) and sampled simultaneously with the vibration information. As the shaft rotates in the reverse direction the first laser (laser A) detects the reflective tape, and generates a square pulse. As the shaft continues to rotate, the second laser (laser B) detects the reflective tape and generates a square pulse.

A software program is used to calculate the arrival times of each pulse by locating the leading edge (positive slope) of each pulse. Linear interpolation is used to more accurately determine the arrival times. The time between a pulse from laser A and a successive pulse from laser B (dt) is determined by the difference between the arrival times of those pulses. However, when a change in direction occurs a pulse from laser A will be followed by another pulse from laser A before a pulse from laser B occurs. Thus, a valid time between two consecutive pulses must always correspond to dt as opposed to dy or dx. In other words the time being compared must be less than half the rotational speed of the reference shaft, hence dt<dT/2. After determining that the correct dt is being used the direction is determined by the sign of dt. If dt is negative, rotation of the shaft is in one direction and if dt is positive, rotation of the shaft is in the opposite direction.

The software program mechanism used to determine dt, rather then dx or dy is a set of "if" statements that find each case where dt<dT/2. The arrival times are evaluated in a logical sequence to ensure the correct pulse arrival time is found in as short a time as possible. The relative position of a pulse from laser B will only change if there is a change in direction where the shaft stops between the two pulses. In order to avoid the search for the reference position for every segment of constant speed, the software program remembers the position for the next comparison.

It is important to note that the first laser (laser A) is used to determine the beginning and end of each revolution. The software program uses this information to convert the vibration data from the time domain to the angle domain. It is critical this pulse is accurate and repeatable, as the angle domain data resampled from each revolution must correspond to the exact same position on the shaft. The second laser (laser B) is only used to determine direction and has nothing to do with resampling of the data.

If the shaft of interest is buried in a gearbox, a determination of the shaft arrival time is more difficult. The arrival times of the buried shaft are calculated using the first reference pulse to indicate the beginning of the revolution. The gear ratio is then used to determine exactly how many revolutions of the reference shaft relates to one revolution of the shaft of interest. This ratio is used with the reference shaft arrival times to linearly interpolate the arrival times of the shaft of interest. In cases where the reference shaft changes direction more than once, it is important to track the relative position of the buried shaft and ensure the first sample always corresponds to the same position on the buried shaft.

The foregoing method of determining arrival times of a buried shaft can be applied to perform TSA on any component that has a rotational speed, which is either a fraction of rotational speed, an integer multiple of rotational speed or a non-integer multiple of rotational speed. A good example of where this may be applied is to a bearing cage rotation. The rotational speed of the cage can be directly related to the rotational speed of the reference shaft, therefore a TSA could be performed on the bearing cage provided limit slip occurs between the balls and the races.

Constant Speed Determination

The software program compares each revolution time (dT) to identify data portions of constant speed. If the revolution time dTn, for a particular revolution n, is within a certain percentage of the revolution time $dT_{n-1}$ of the previous revolution n−1, the speed is determined to be constant. The time for each successive revolution is compared with that of the previous revolution until the percentage variation is greater than a certain threshold. This threshold can be set in the software program and typically has a default of 1%. A minimum of three consecutive constant speed revolutions are required for resampling. Thus, in the absence of three consecutive revolutions of constant speed, the relevant samples are discarded and the program advances to the next arrival time. This process is repeated until all the arrival times of constant speed revolutions are determined.

Resampling

Samples of vibration data collected over each revolution, for each constant speed portion with a fixed sample rate, are resampled to provide a fixed number of samples per revolution. The minimum number of samples per revolution to avoid aliasing is the quotient of original sampling rate ($H_z$) and the minimum shaft speed ($H_z$). After resampling of each constant speed portion, using cubic interpolation, all the portions relating to each particular direction of travel of the drive are appended together. This results in a continuous set of samples in respect of each direction of travel, with a fixed number of samples per revolution. The total number of samples in each direction of travel is the number of samples per revolution multiplied by the number of revolutions of constant speed identified in each respective direction. These samples sets are treated as continuous data that can be processed using various vibration analysis techniques.

Software Implementation

The software program was developed in the Matlab and Labview environments. Labview was primarily used to interface the Matlab script files with the data acquisition card used in the Personal Computer (PC).

Tables 1 to 7 at the end of the Detailed Description contain Matlab script files used to practice embodiments of the invention:

Table 1: Arrival Times Script 1 (main program)

Table 2: Arrival Times. Script 2 (function used in Arrival Times Script 1)

Table 3: Shaft of Interest Arrive Time Script

Table 4: Resampling vibration data into forward and reverse directions script

Table 5: Pulse reference check script (direction determination)

Table 6: Resampling script (including interpolation)

Table 7: Kurtosis Calculation Script

Further Detail Relating to the General Embodiment

FIGS. 26 to 30 provide additional detail relating to certain of the steps in FIG. 1.

Figure 26:
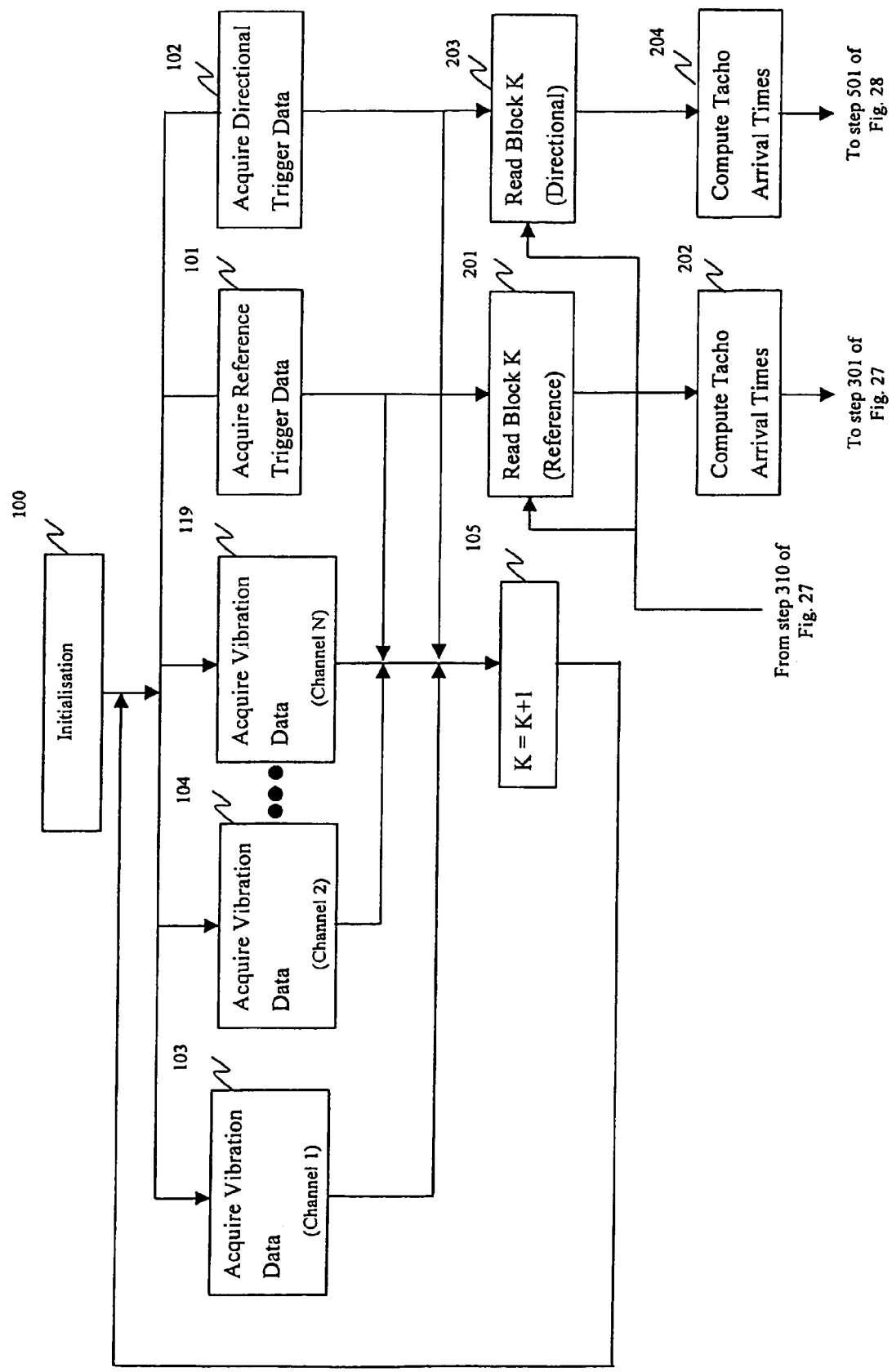
FIGS. 26 to 30 are flow charts showing additional detail of various steps in FIG. 1.

The data is acquired in blocks, the size of which are selected to ensure that data relating to at least two complete revolutions are captured in each block. An SD-Section is a section of data that is continuous in the time domain and which relates to a specific speed and acceleration range and direction. The following variables are defined:

N=the number of channels,
K=the data acquisition block number,
L=the SD-section number,
$R_K$=the number of revolutions in the $K^{th}$ block,
Revs=the number of revolutions in each direction to collect, and
Z=the number of points per revolution to resample (this value is determined based on the sampling rate, the rotational speed of the shaft and the desired up sampling ratio).
$S_x$=shaft number x FIG. 26 shows additional detail relating to steps 110 and 120 of FIG. 1, which relate to acquisition of the vibration data and the extraction of data processing triggers. Specifically, steps 101–104, 105 and 119 of FIG. 26 relate to step 110 of FIG. 1 and steps 201–204 of FIG. 26 relate to step 120 of FIG. 1.

At step 100, the following variables are each initialised to zero:
the data acquisition block number (K),
the SD-Section number (L),
the total number of revolutions in each required direction ($R_{FWD}$, $R_{REV}$), and
the number of useable revolutions for each direction of each shaft (Act_Revs$_{SxDFWD}$, Act_Revs$_{SxDREV}$).

If a direction is not initialised, the SD-Sections for that direction will not be collected.

The reference trigger data is collected at step 101 and the directional trigger data is collected at step 102. The actual vibration data for channels 1, 2 and N are acquired at steps 103, 104 and 119, respectively. The number of channels for acquiring actual vibration data is typically limited by the data acquisition hardware or the data processing requirements. Steps 101 to 104 and 119 typically occur simultaneously due to parallel implementation in of the sampling hardware for each channel.

At step 105, the data acquisition block number is incremented for collecting a subsequent set of samples at steps 101 to 104 and step 119.

At steps 201 and 203, the $K^{th}$ block of data is read for the reference and directional triggers, respectively.

At steps 202 and 204, the tachometer arrival times $A_{1K}(t)$ and $A_{2K}(t)$, for tachometers 1 and 2, respectively, are computed for the $K^{th}$ block of data. These values are used to determine the speed, acceleration and direction for each revolution. Processing continues at step 501 of FIG. 28 after step 204 of FIG. 26, at step 350 of FIG. 29 after step 307 of FIG. 27, and at step 301 of FIG. 27 after step 202 of FIG. 26.

Figure 27:
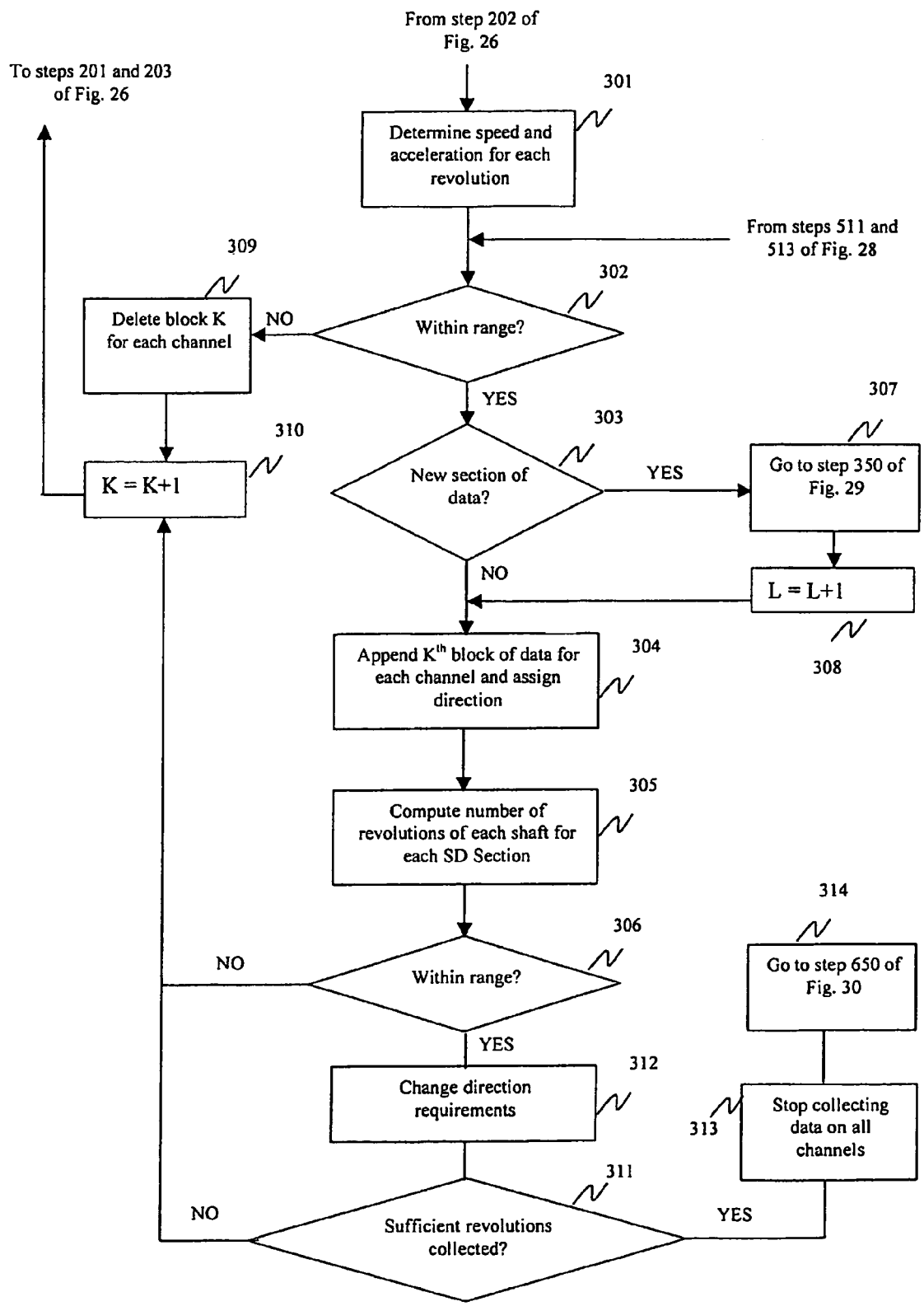
Figure 28:
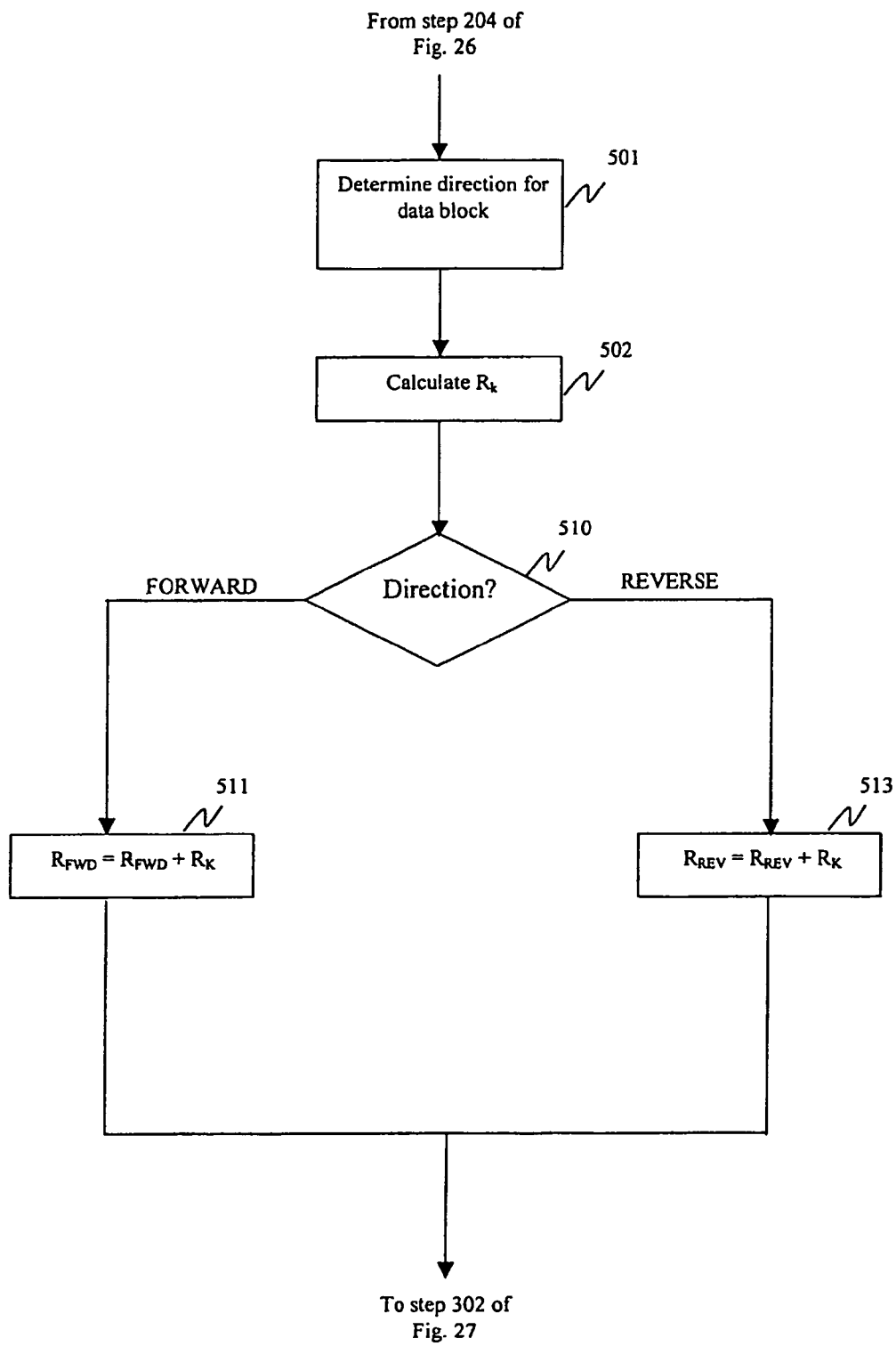
Figure 29:
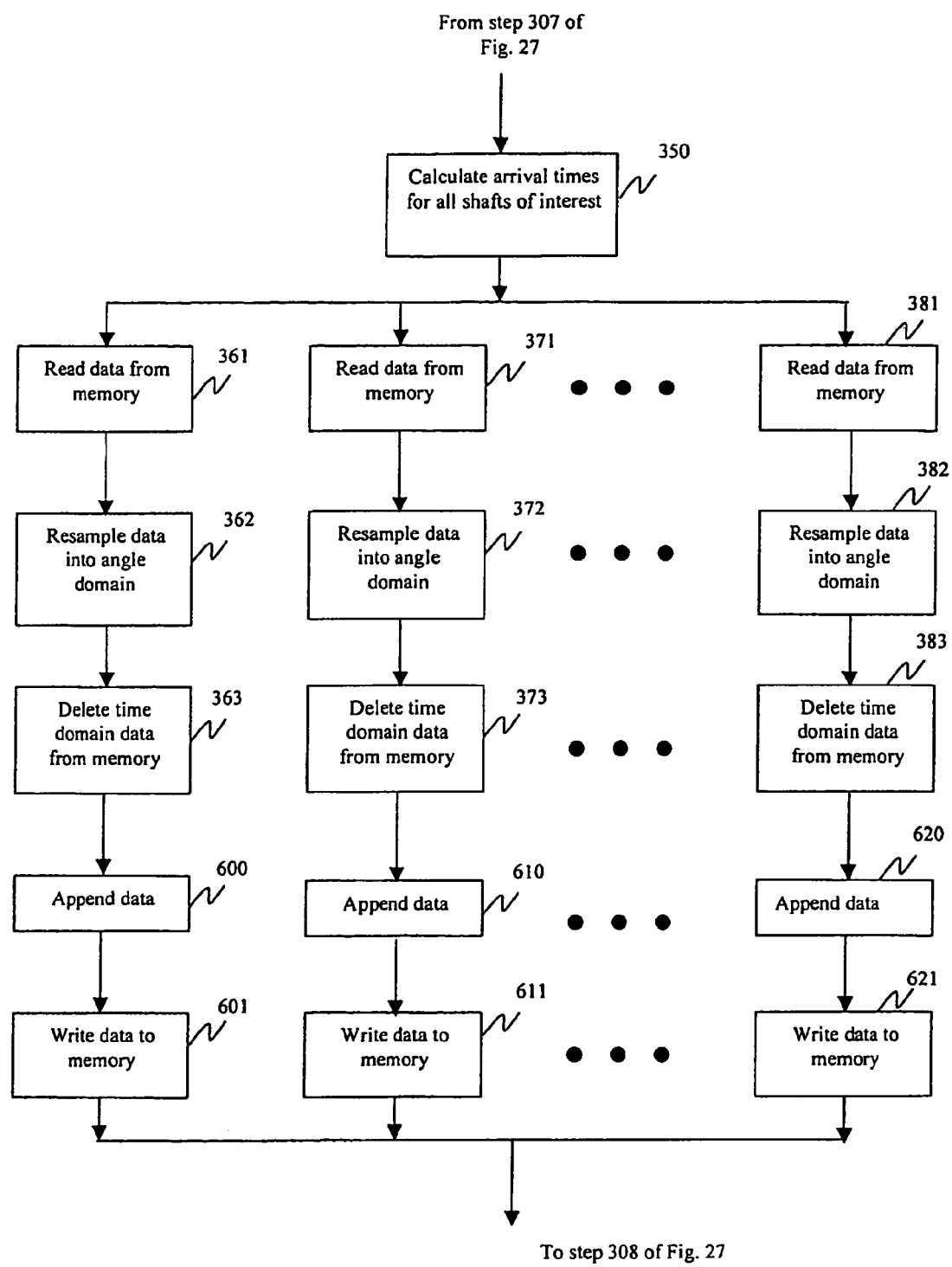

FIGS. 27 and 28 and steps 361, 371, 381, 362, 372 and 382 of FIG. 29 show additional detail relating to steps 142 and 130 of FIG. 1, respectively, which relate to speed normalisation of the vibration data. To some extent, certain of the steps in FIGS. 27 and 28 occur simultaneously.

Referring firstly to FIG. 28, the trigger information is interpreted to determine the direction of the revolutions that occur during the $K^{th}$ block, at step 501. Step 501 follows on from step 204 of FIG. 26.

Then, at step 502 the total number of revolutions in the $K^{th}$ block ($R_k$) is calculated. This value is used to track the total number of revolutions in each direction and provides information that is required to determine the relative position of any hidden shafts.

If the revolutions in the $K^{th}$ block are in the forward direction, at decision step 510, the number of revolutions in the forward direction is incremented by the number of revolutions in the current block, at step 511. Alternatively, if the revolutions in the $K^{th}$ block are in the reverse direction, at decision step 510, the number of revolutions in the reverse direction is incremented by the number of revolutions in the current block, at step 513. For both foregoing cases, processing continues at step 302 of FIG. 27. Determination of the trigger and direction of rotation of the shafts of interest are further described elsewhere in this document.

Referring now to FIG. 27, the trigger information is interpreted to determine the speed and acceleration of the revolutions that occur during the $K^{th}$ block, at step 301. Step 301 follows on from step 202 of FIG. 26.

The speed, acceleration and directional information are analysed at step 302. If the current direction is not required and/or the speed and acceleration values are not within the desired range (NO), at decision step 302, the $K^{th}$ block for each channel is deleted from memory at step 309. Then, the data acquisition block number (K) is incremented at step 310. Processing subsequently continues at steps 201 and 203, of FIG. 26, for processing of the next block (K+1).

The first time that the data collected falls within the specified speed and acceleration range and is in a direction that is required (YES), at decision step 302, the data is stored in memory. Every subsequent block of data that is adjacent in the time domain to the previous block of data within the desired speed, acceleration and direction parameters will be appended to the end of the previous block at step 304.

This process results in a continuous segment of data (in the time domain) that is within the acceleration, speed and directional requirements. This segment is referred to as an SD-Section (Speed & Direction Section). When the consecutive blocks no longer have the same direction and/or no longer fall within the same speed and acceleration conditions a new SD-Section is started. This process is controlled by steps 303, 307 and 308.

Step 303 checks whether the previous valid block was adjacent (in the time domain) to the current block. If not, the previous SD-Section is exported at step 307 to step 350 in FIG. 29 for additional processing. Thereafter, the SD-Section number (L) is incremented at step 308 and continues at step 304.

After each block is appended to the current SD-Section at step 304, the number of useable revolutions of each shaft is computed at step 305. The number of useable revolutions of the hidden shafts is computed using an algorithm that tracks the shafts relative position and determines the number of complete and continuous revolutions of the hidden shaft.

At step 306 the actual number of revolutions of each shaft in each direction is tested. If the number of lo revolutions in the current direction exceeds the total number required for that direction (YES), the direction parameter will be changed at step 312 to "no longer required". This signifies to the control program not to process any more data in the particular direction as sufficient revolutions have been collected.

Next, at step 311, it is determined whether sufficient revolutions for each direction and each shaft been been collected. If YES, the process stops collecting data at step 313 and moves on to step 650 of FIG. 30, where the program waits for all the SD-Sections to be resampled and appended to the appropriate SDNU (Speed Direction Normalised Unit). If NO, additional revolutions are still to be collected and the block number (K) is incremented at step 310. Processing then continues at steps 201 and 203, of FIG. 26, in respect of the next block.

FIG. 29 shows additional detail relating to step 307 of FIG. 27, which relates to processing of the data of a previous SD-Section while data of a current SD Section is collected.

At step 350, the arrival times (ie. the times at which a shaft passes the shaft's original trigger point) are computed for each of the shafts.

At steps 361, 371 and 381 the current SD-Section data for each respective channel is recalled from memory. Then, at steps 362, 372 and 382, the SD-Section data for each respective channel is resampled into the angle domain. The resampling process is further discussed elsewhere in this document.

At steps 363, 373 and 383, the time domain SD-Section data for each respective channel is deleted from memory, leaving only the resampled angle domain SD-Section data in memory.

Steps 142, 144 and 146 of FIG. 1, steps 501 to 513 of FIG. 28 and steps 600, 610 and 620 of FIG. 29 constitute the process of Direction Normalisation. The direction of the data in the current SD-Section was identified at steps 501 to 513 of FIG. 28.

Returning now to FIG. 29, the successive portions of data relating to the same direction are grouped together by appending successive portions to an accumulation of previous data portions also relating to that direction, at steps 600, 610 and 620. The data in this format is referred to as a Speed Direction Normalised Unit (SDNU).

Similarly, when an SD-Section has a different direction (ie. forward in the first case and reverse in the second case), as shown in FIG. 1 as steps 144 and 146, the successive portions of data relating to that direction are grouped together by appending successive portions to an accumulation of previous data portions also relating to that direction.

A SDNU will exist for every channel and every direction available for that channel. The portions of data are grouped in such a way that the first sample of each successive portion appended corresponds to the position of the reversible drive immediately following the position of the reversible drive corresponding to the last sample of the data portion last appended.

The synchronous components of each SDNU are continuous because each SD-Section is continuous in both the angle and time domains and when each SD-Section is appended to form an SDNU, the angle domain continuity (ie. synchronous components) is maintained. As explained elsewhere in this document, such continuity is imperative for the process of time synchronous averaging.

The appending of SD-Sections to create an SDNU does, however, cause discontinuities in any non-synchronous components. These discontinuities occur at the point where two SD-Sections are appended and occur as a result of non-synchronous components not repeating over each revolution. Hence, the phase of these non-synchronous components will change when a break in the time domain data collection process occurs (ie. when SD-Sections are appended).

If all the components of the signal are not continuous, the order tracking or demodulation process may result in spurious components in the FFT spectrum. This is due to the fact that the FFT process assumes a signal to be continuous over the period of the signal analysed.

At steps 601, 611 and 621 the length of the current SD-Section is written to the header of that SD-Section. This information is used to track the location of any discontinuities and can either be used to avoid discontinuities when processing the SDNU's, smooth the discontinuities, remove the discontinuities, or understand the effect of the discontinuity on the FFT. Subsequent processing continues at step 308 of FIG. 27.

Figure 30:
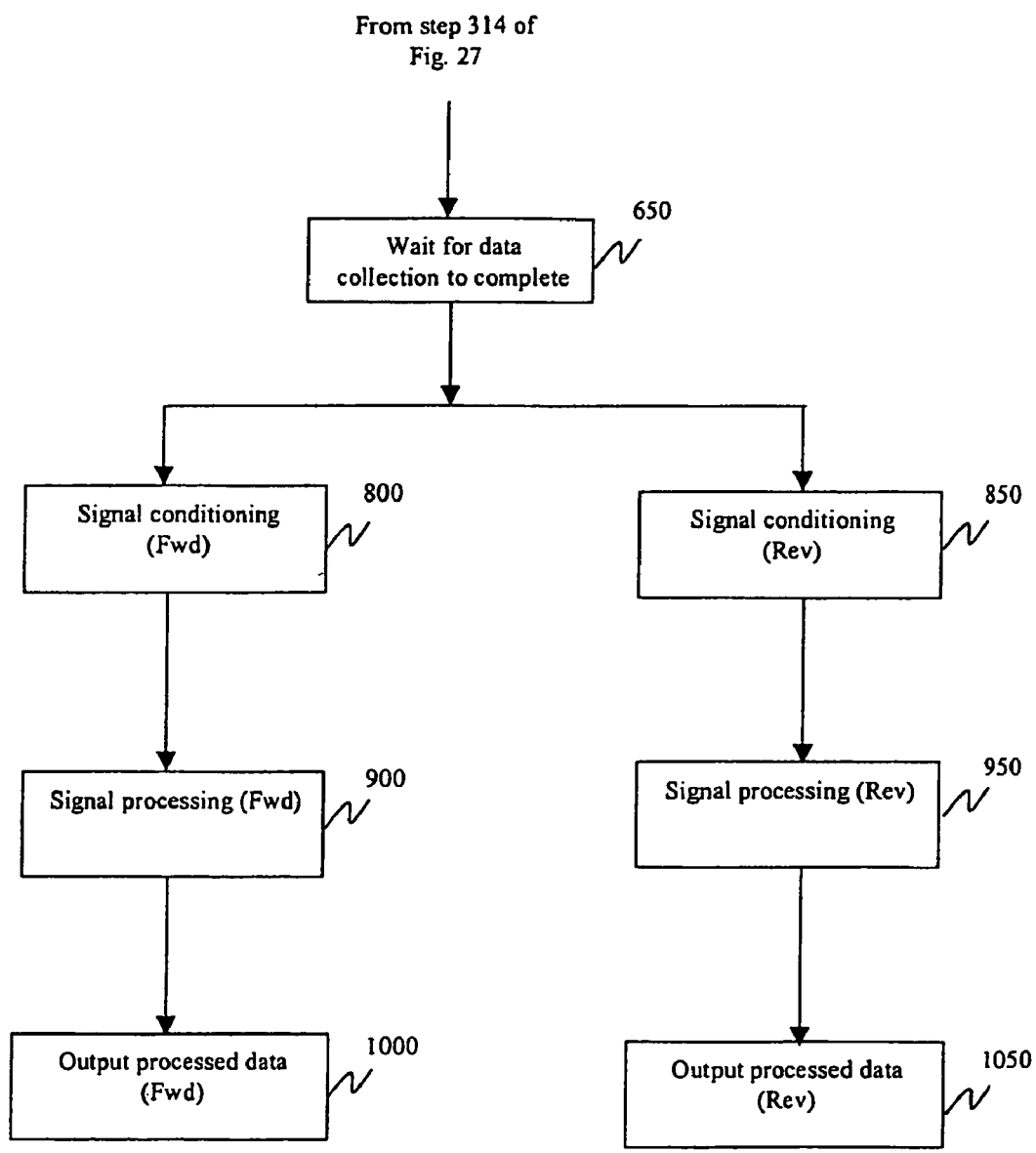

Referring now to FIG. 30, the program waits for all revolutions in every required direction on every shaft to be collected & resampled into the angle domain, at step 650. This program step is subsequent to step 314 of FIG. 27. When all the data is available, signal conditioning occurs on every SDNU at steps 800 and 850 for the respective directions. Signal conditioning of the data is performed to eliminate the effects of aliasing and spectral leakage. During resampling, the number of samples is increased relative to the number of original samples (ie. upsampling using cubic interpolation). A digital low-pass filter is thus applied to the data to remove any frequencies above those that can be accurately represented by data sampled at the original sampling rate in accordance with the Nyquist criterion. However, aliasing errors due to resampling will be attenuated by the time synchronous averaging process. The resampled waveform is filtered by a low pass $9^{th}$ order Butterworth filter to remove frequencies above half the original sampling frequency, thus avoiding errors due to aliasing.

Leakage occurs when performing a Fast Fourier Transform (FFT) and is due to the fact that the data is sampled over a finite time period and the frequency components are cut in mid-cycle. Leakage is reduced by the technique known as windowing the signal. Windows used include Hanning, Hamming, seven Term B-Harris, four Term B-Harris, Flat Top, Blackman, Exact Blackman and Blackman-Harris.

At steps 900 and 950 of FIG. 30 and steps 164 and 166 of FIG. 1, the data accumulated in the respective directions undergoes signal processing. The signal processing is typically comprised of standard vibration analysis techniques. One technique of analysis involves averaging the filtered time waveform in the time domain to produce a Time Synchronised Average. Then, an orders FFT is computed on the digital TSA time waveform, thus identifying the spectrum of frequencies that are integer multiples of shaft rotation frequency. The Kurtosis can also be computed, using the data of the digital TSA time waveform.

Another technique of analysis involves use of the resampled data to produce an Order Tracked spectrum that is averaged in the frequency domain. This requires transformation of the data to the frequency domain, by means of an FFT, prior to signal averaging.

At steps 1000 and 1050 of FIG. 30 and steps 174 and 176 of FIG. 1, the data processed in the forward and reverse directions, respectively, is output to a display monitor or printer for human visual analysis. The interpretation of vibration signals is a highly skilled art that requires extensive machinery knowledge and a detailed understanding of mechanical vibrations. Certain known correlations can be applied to predict incipient failures. For example, a specific type of fault condition may be identifiable by a specific vibration signature. Furthermore, the extent of existing damage may be related to the magnitude of one or more specific frequency components.

However, it will be apparent to those skilled in the art that variations to the manner of output of the processed data can be made without departing from the scope and spirit of the invention. For example, the processed data may undergo further processing to; smooth any discontinuities within SDNUs, remove discontinuities within SDNUs, or to facilitate classification of predefined fault conditions by machine-based correlation of acquired vibration signatures with stored vibration signatures, where characteristics of the stored signatures are representative of specific fault conditions.

The further processed data can be used to provide alarm levels by means of visual and/or audible indicators. The alarm levels can be categorised into warning, danger and shutdown categories. The shutdown category may be the level at which the machine is automatically shutdown to avoid catastrophic failure.

Shaft Tracking

Figure 31:
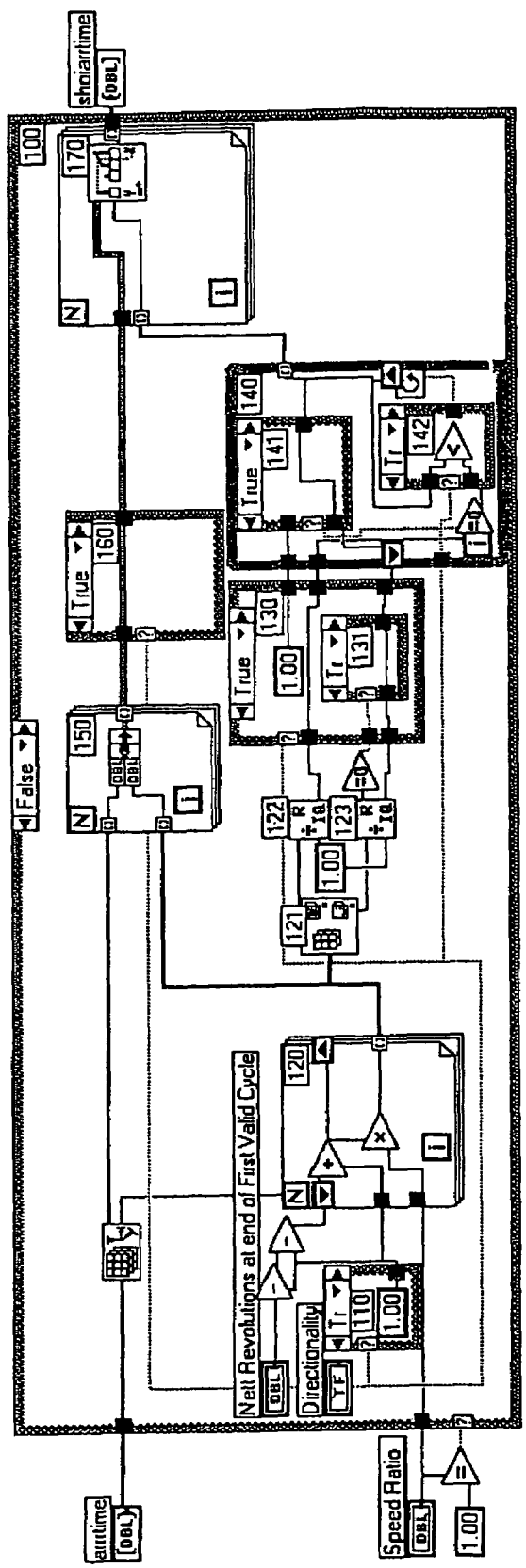
FIGS. 31, 32 and 33 are a visual representation of software program code for tracking intermediate buried shafts.
Figure 32:
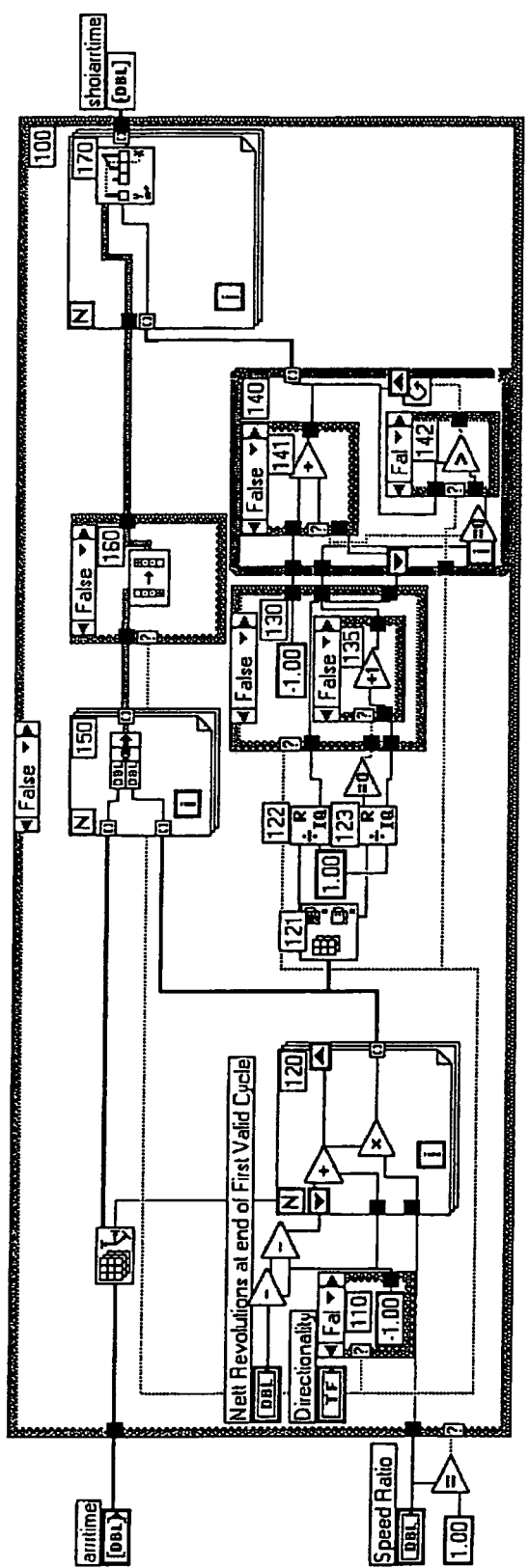
Figure 33:

FIGS. 31, 32 and 33 show software program code for tracking the position of any intermediate shafts that may be buried in a gearbox by tracking the number of forward and reverse rotations of a reference shaft. The program code is written in Labview™, which is a graphical programming language developed by National Instruments. The term "buried shaft" refers to a shaft that cannot be externally accessed for generation of a trigger. This program code is thus only necessary in cases where the shaft of interest is a buried shaft. In cases where the trigger can be directly derived from the shaft of interest, there is no need to track the relative shaft position as the trigger pulse indicates the zero degree position of the shaft of interest.

The zero degree position of the buried shaft is the point at which the reference shaft is at its zero degree position for the first time in the data acquisition window. The zero degree position of the buried shaft will not always occur when the reference shaft is at its zero degree position because the buried shaft rotates at a different speed to the reference shaft, and it is for this reason that it is imperative that the number of forward and reverse rotations of the reference shaft are tracked to determine the nett position of the buried shaft. The nett position of the buried shaft references where the zero degree location of the buried shaft occurs in relation to the reference shaft. Tracking of the zero degree position of the buried shaft ensures that, in cases where the shaft changes direction more than once, the first sample after resampling into angle domain will always correspond to the same position of the buried shaft.

The inputs to this portion of program code are the arrtime array, the Nett Revolutions at end of First Valid Cycle, the Speed Ratio and the Directionality. The arrtime array is an array of arrival times for the reference shaft (trigger shaft) that relate to the zero degree position of the reference shaft in the SD_Section. As stated elsewhere in this document the SD_Section is a section of vibration data that is collected under specific desirable speed, acceleration and direction conditions. The variable Nett Revolutions at end of First Valid Cycle represents the nett revolutions that the reference shaft (trigger shaft) has undergone from the beginning of the entire data acquisition process. This includes the first cycle in the current SD_Section (ie. the cycle from the first arrival time to the second arrival time). The Speed Ratio is the ratio of the buried shaft speed to the reference shaft speed (Buried Shaft Speed/Reference Shaft Speed). The directionality input is a boolean control variable that states the direction of rotation of the SD_Section: True for Forward and False for Reverse.

Referring to FIG. 31, the directionality of the current SD_Section is read and interpreted at step 110. If the current direction is forward (True), case 110 outputs a value 1 and if reverse, case 110 outputs a is value of −1. The output value is used at step 120 to set up an array of indexes that relate the arrival times (arrtime) to the position of the buried shaft. This is achieved by multiplying the relative rotation position of the reference shaft by the Speed Ratio. The indices that relate the arrival times to the relative position of the buried shaft are then sent to steps 150 and 130.

The code between steps 120 and 130 (comprising steps 121 to 123) essentially extracts the maximum and minimum values in the array. These maximum and minimum values are then used at step 130 to determine the beginning and end of the SD_Section. Whether the maximum value is the beginning or the end of SD_Section depends on the directionality of the current SD_Section. If the direction is forward, case 130 is true and case 131 is processed to determine if the reference to the first revolution should be incremented by 1 or not. If the remainder of the division at step 123 is zero then the first value will not need to be incremented at step 131, however, if the remainder of the division at step 123 is not zero then the first value will need to be incremented by 1 at step 131. This is due to the fact that the result of the integer quotient at step 123 is 1 below the first complete revolution of the buried shaft, in the case. A similar process is followed at step 130 if the directionality of the current SD_Section is reverse.

The output from step 130 is a start and end integer that is used in step 140 to generate an array of integers that relate to the zero degree position of the buried shaft. These values are used to interpolate the results of step 160 and to find the arrival times of the zero degree position of the buried shaft.

At case 160, the cluster containing the arrival times and the index of relative positions of the buried shaft will be reversed if the direction of the current SD_Section is reverse. If the direction of the current SD_Section is forward then there is no need to reverse the cluster as the relative positions of the buried shaft are already in ascending order.

The final step in the program is to interpolate the arrival times and relative positions of the buried shaft to determine the times at which the buried shaft is at a zero degree position. The buried shaft arrival times are referred to in the program code as the shaft of interest arrival times (shoiarrtime) and are later used in conjunction with the vibration data sampling times to resample the vibration data into the angle domain where the angle domain for these cases relates to the buried shaft (ie. 0 to 360 degrees of the buried shaft).

Harrison Lathe Example

TSA was performed on a 30-year-old Harrison lathe, using an embodiment of the invention, to demonstrate the effect of minor faults on the time waveform and frequency spectrum.

The gearbox of the lathe includes a drive shaft, an intermediate shaft and an output shaft with three gears thereon. The first analysis is of the reverse direction side of gear 2, which is located on the output shaft and has 49 teeth. Gear 2 is the output gear for the most common machining speed in the gearbox and therefore represents the most well used gear in the gearbox.

Figure 3:
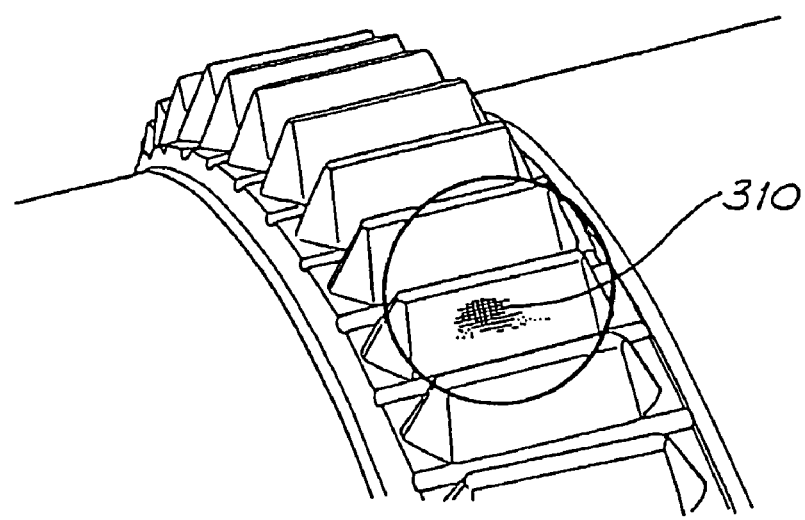
FIG. 3 is a perspective view of a portion of a gear wheel showing general deterioration of the teeth.
Figure 4:
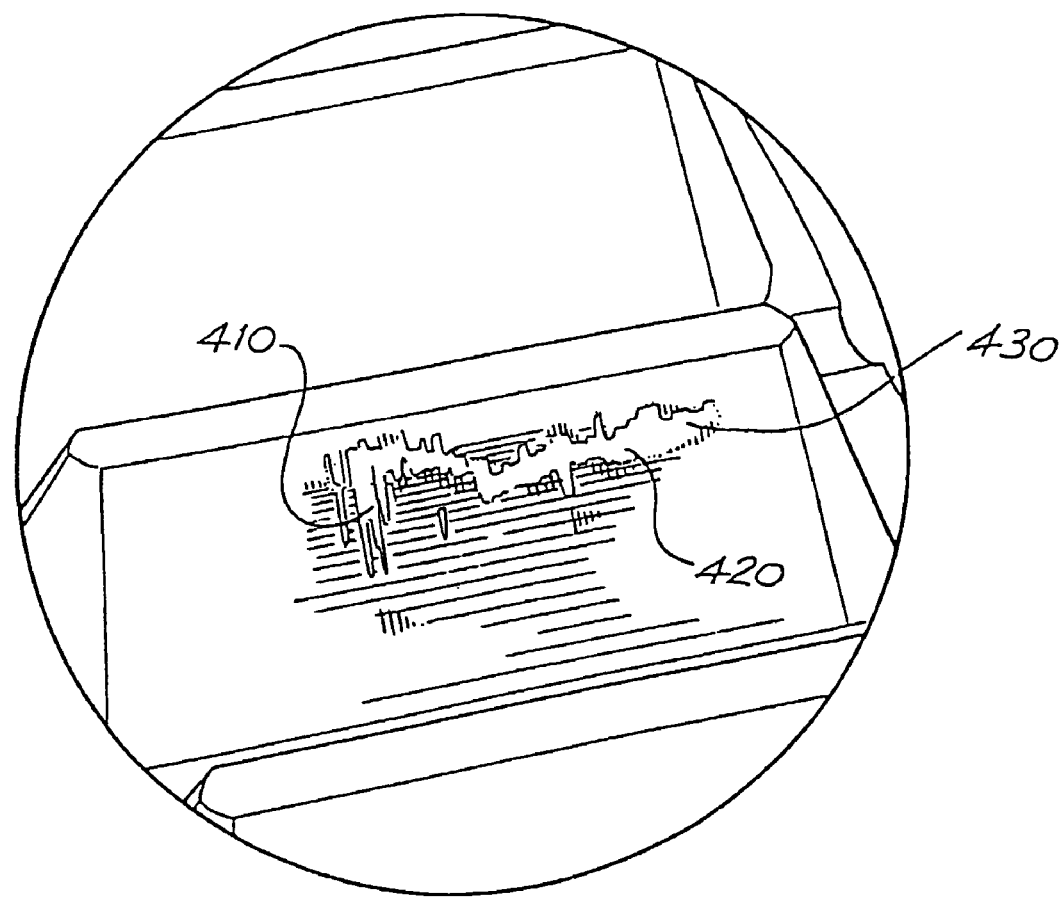
FIG. 4 is an enlarged perspective view of a tooth shown in FIG. 3.

FIGS. 3 and 4 show a typical tooth profile of gear 2. FIG. 4 shows an enlarged view of a gear tooth 310, shown in FIG.

3. The whole gear shows zones of localised adhesion, abrasive wear and polishing. Zones of localised adhesion 410 and 420 are shown in FIG. 4. It is most likely that adhesion occurred first, resulting in fine particles being removed from the surface of the teeth that have caused subsequent abrasive wear and polishing. The tooth also shows signs of moderate plastic metal flow 430 in FIG. 4.

Deviations from a perfect tooth profile result in smeared and uneven peaks in the TSA time waveform due to the contact between the two meshing teeth no longer being smooth. Additional vibrations are introduced as the uneven surfaces slide past each other. The TSA waveform of FIG. 5, after 500 averages, clearly shows a spike in energy between 180 and 200 degrees and FIG. 6 shows the teeth that these spikes correspond to.

Figure 5:
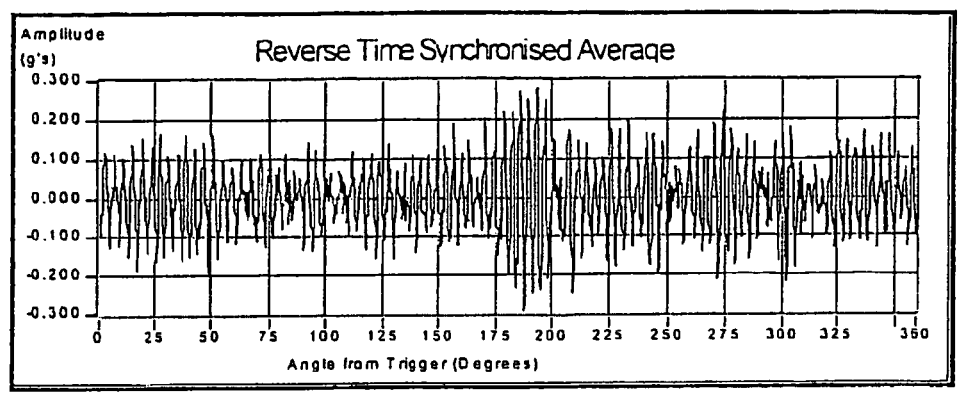
FIG. 5 is a plot of a TSA time waveform for the gear wheel shown in FIG. 4, after 500 averages.
Figure 6:
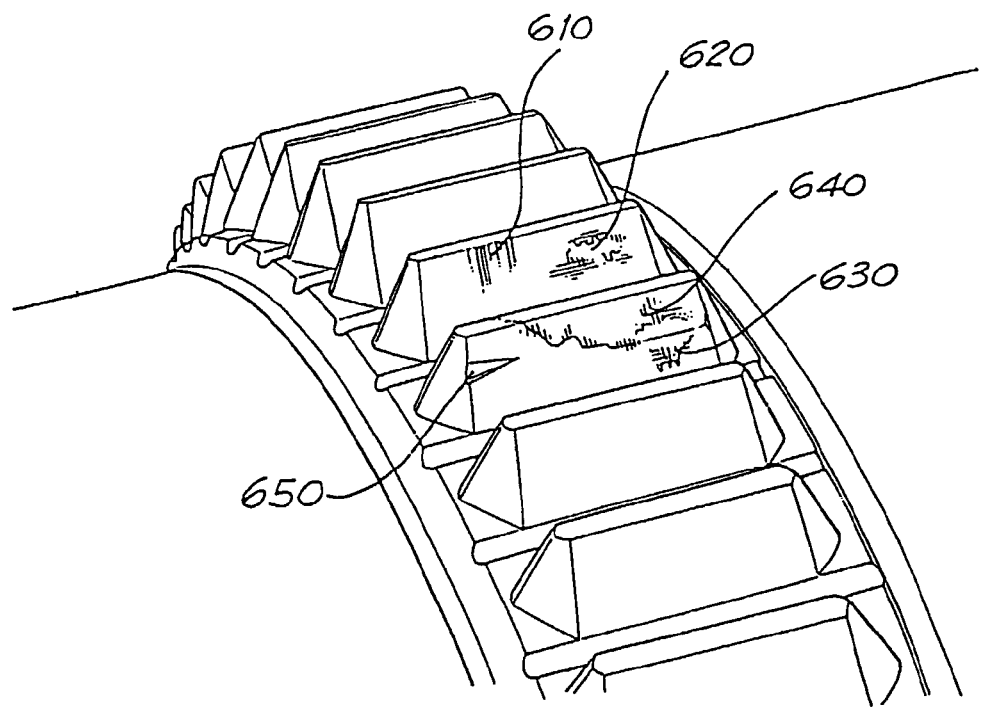
FIG. 6 is a perspective view of a portion of the gear wheel of FIG. 3 showing deterioration of specific teeth.

The teeth corresponding to the spike in energy between 180° and 200° demonstrate characteristics that likely contribute to the increased vibration magnitude seen in FIG. 5. The first is a very deep groove 650, as shown in FIG. 6. As the gear box has no clutch, and the gears simply slide into each other during changing, it is most likely that the groove 650 resulted from a gear change that occurred whilst the gears were still rotating. It appears that the corner of the meshing gear has collided with this gear, whilst trying to lock mesh. As rotation continued, and the gear moved further in towards full mesh, the angle on the tooth shown in FIG. 6 has been scratched. This represents non-localised adhesive wear. Localised adhesive wear damage 620 and 630 and rolling contact fatigue damage 640 is also shown in FIG. 6. The wear likely contributes to the spikes of energy shown in FIG. 5.

Figure 7:
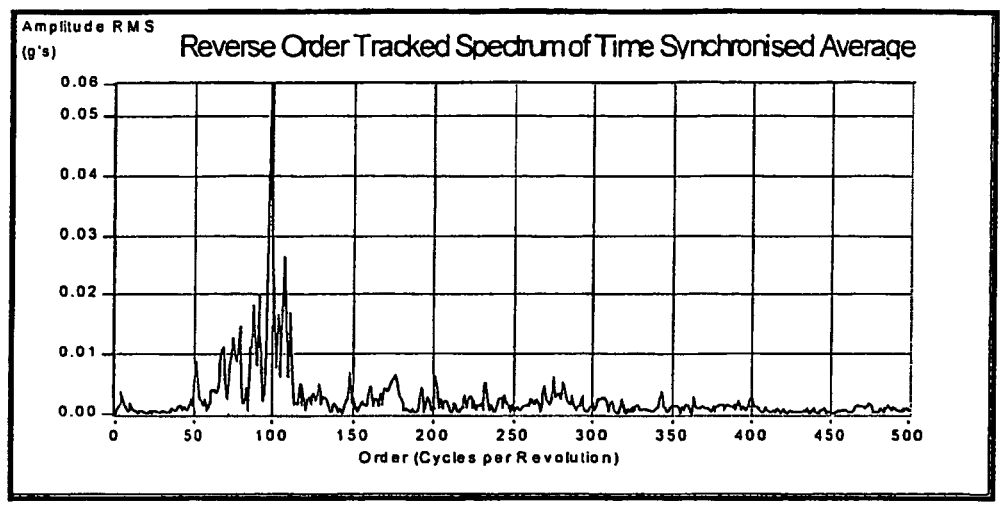
FIG. 7 is a plot of a TSA frequency spectrum of the gear wheel of FIG. 3, after 500 averages.

FIG. 7 shows the Order Tracked spectrum for the Time Synchronised Average and has a number of sidebands associated with the tooth meshing order. These sidebands can be attributed to any of non-uniform wear on the gear teeth, tooth damage, and incorrect spacing between gears. It is tooth damage, in this case, that caused the orders around tooth mesh to have relatively high magnitudes. If the gear were in better condition, the side bands around tooth-meshing order would have smaller relative amplitudes.

Figure 8:
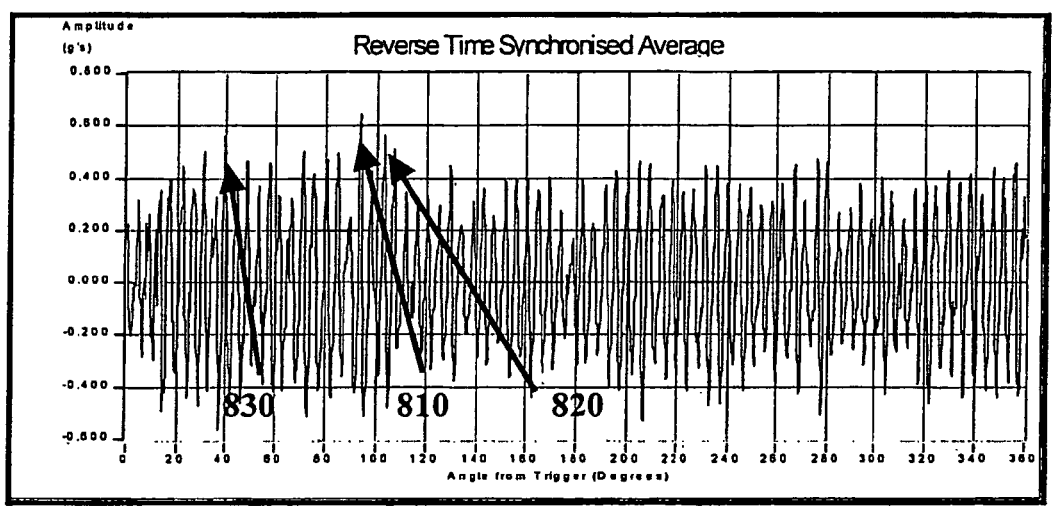
FIG. 8 is a plot of a TSA time waveform for a gear wheel exhibiting less deterioration than the gear wheel of FIG. 3, after 500 averages.

A spectrum for a perfect tooth profile would approximate a sine wave with frequency corresponding to the tooth meshing frequency or one of its harmonics. However, as no gear is perfect, there will always be deviations from the perfect profile. The time synchronous average of gear 3 in the reverse direction, after 500 averages, is shown in FIG. 8. Gear 3 has 81 teeth and is also located on the output shaft. FIG. 8 has a much smoother profile, compared to FIG. 5, and provides a good example of a time waveform for a gear in relatively good condition.

Figure 9:
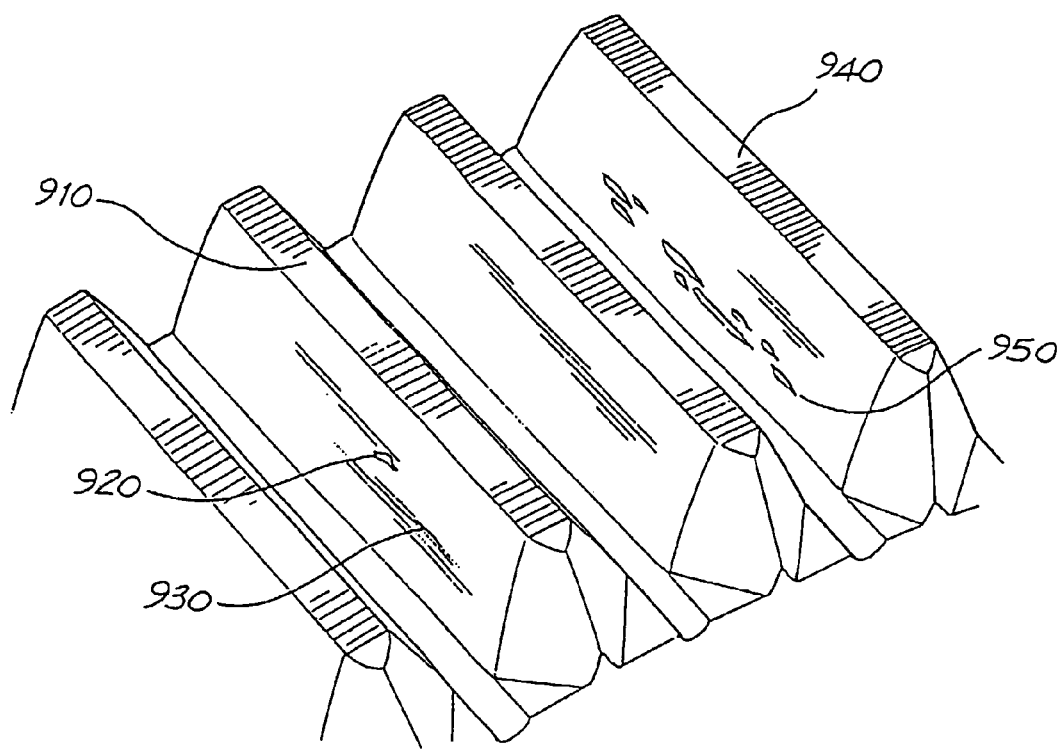
FIG. 9 is a perspective view of a portion of the gear wheel represented in FIG. 8.
Figure 10:
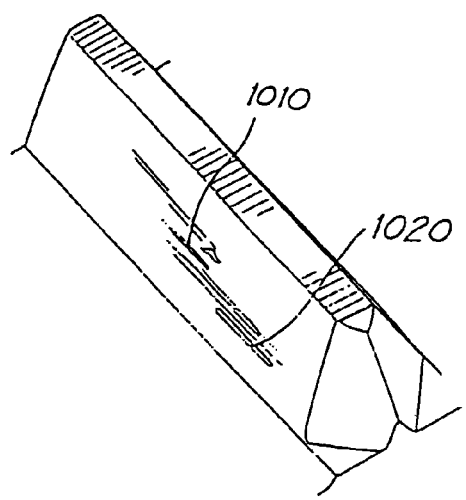
FIG. 10 is an enlarged perspective view of a specific tooth shown in FIG. 9.

The TSA time waveform of FIG. 8 has very distinct peaks on either side of 100°. The tooth just before 100° is the $22^{nd}$ tooth, therefore the peaks 810 and 820 on either side correspond to the $21^{st}$ and $23^{rd}$ teeth, respectively. Distinct rolling contact fatigue damage or possibly hard particle ingress damage on the $21^{st}$ tooth 940 and the $23^{rd}$ tooth 910 is shown in FIG. 9. FIG. 10 shows an enlarged view of rolling contact fatigue damage or possibly hard particle ingress damage 1010 and 1020 sustained on the $23^{rd}$ tooth 910 of FIG. 9. The $22^{nd}$ tooth, located between the $21^{st}$ tooth 940 and the $23^{rd}$ tooth 910 appears to be in good condition.

Figure 11:
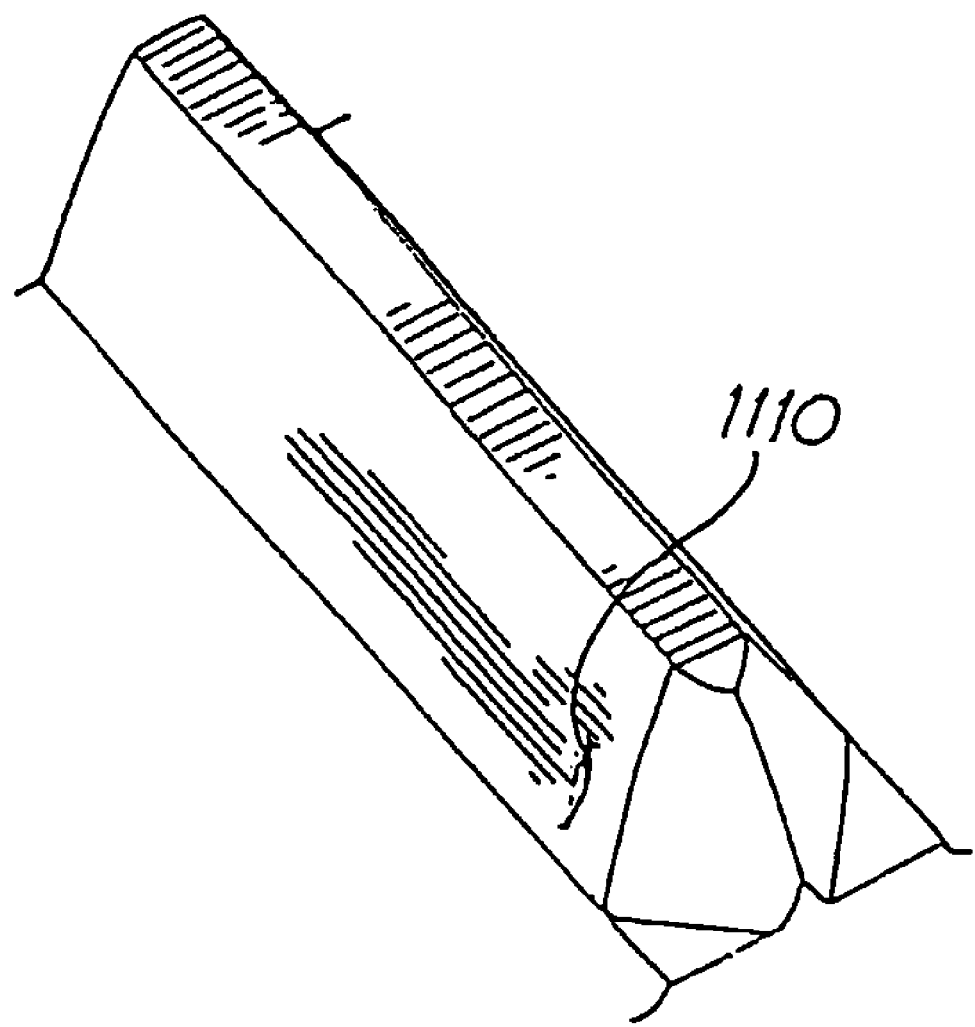
FIG. 11 is an enlarged perspective view of another tooth of the gear wheel represented in FIG. 8.

The TSA time waveform in FIG. 8 also shows a distinct peak 830 corresponding to the $9^{th}$ tooth. This peak is most likely attributable to the small hard particle indentation 1110 shown in FIG. 11. It is possible that the indentation was caused by a piece of the mating gear that may have been chipped off whilst attempting to change gears in motion.

Figure 12:
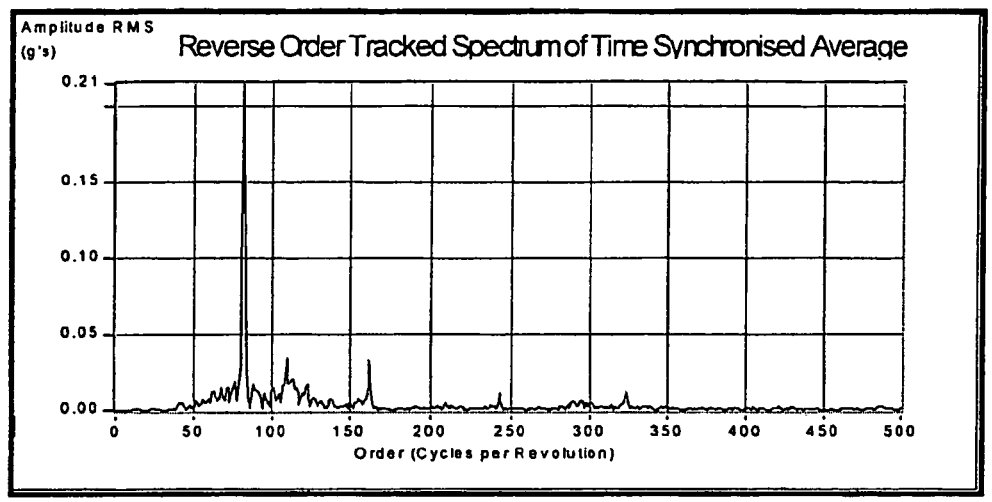
FIG. 12 is a plot of a TSA frequency spectrum of the gear wheel represented in FIG. 8, after 500 averages.

FIG. 12 shows the spectrum of the TSA for gear 3 (after 500 averages), including a very sharp peak at 81 orders, which is the fundamental tooth meshing order. Additionally, no side bands can be seen as the orders around the tooth meshing order have very low magnitude. This confirms that gear 3 is in good condition.

Friction Winder Gearbox Example

A further analysis was conducted on a six-month-old gearbox of a friction winder capable of lifting 10 tonnes of ore from an underground gold mine. The skip is counter balanced with a 10 tonne mass, therefore the gearbox is under the greatest load when the skip is empty and travelling down.

Figure 13:
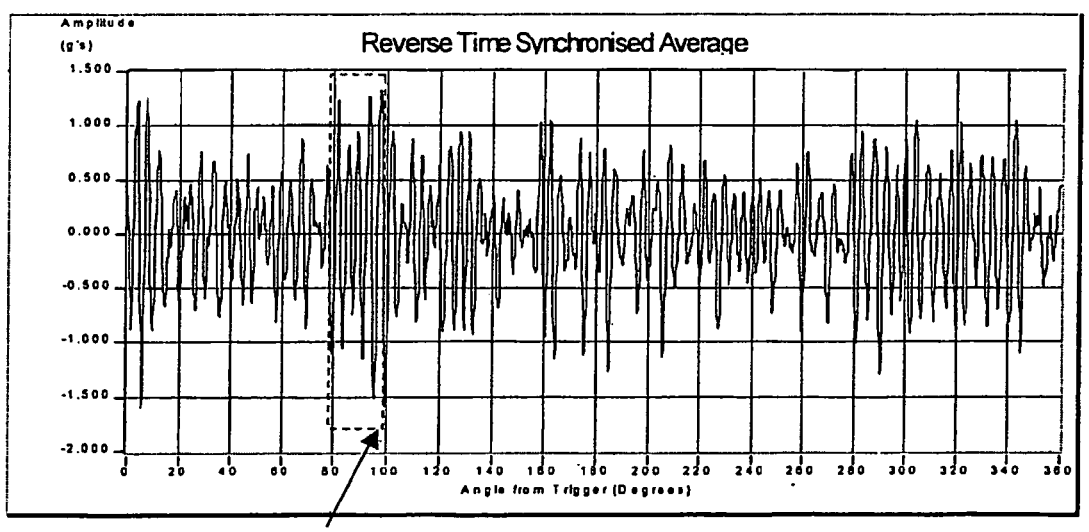
FIG. 13 is a plot of a TSA time waveform for a gear wheel on the input shaft of a friction winder after 500 averages, using data sampled from the output end of the input shaft.
Figure 14:
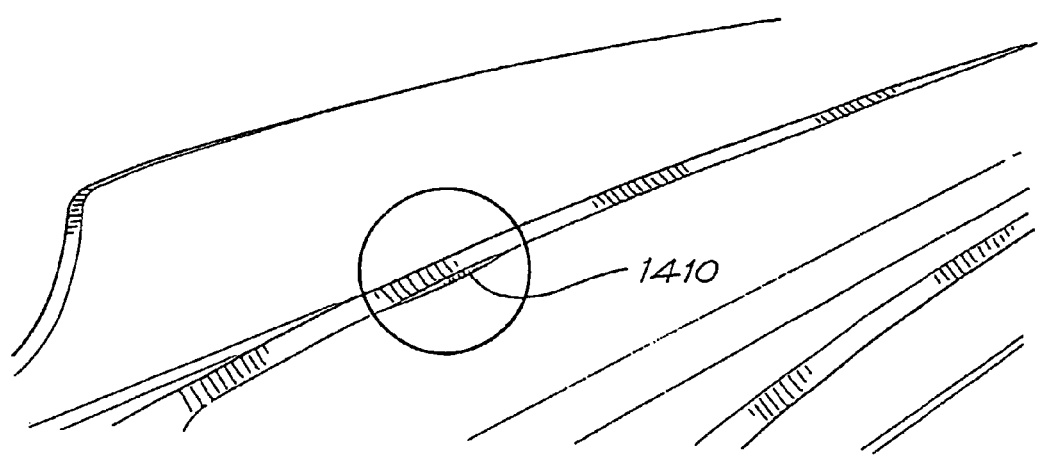
FIG. 14 is a perspective view of a large indentation on a tooth of the gear wheel represented in FIG. 13.
Figure 15:
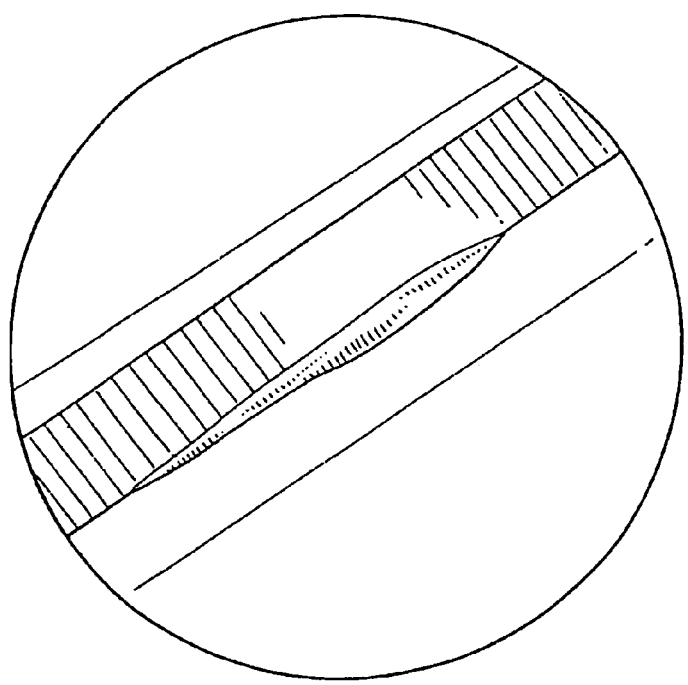
FIG. 15 is an enlarged view of FIG. 14.

The analysis was of the input shaft drive. An accelerometer was initially mounted in the vertical direction above the drive end bearing (output end). The resulting TSA time waveform for the reversing direction, after 500 averages, is shown in FIG. 13, which exhibits distinct peaks 1310 around 90°. An inspection of the gear, which has 17 teeth, revealed minor defects on the tooth that corresponds to this position. The tooth that corresponds to the peaks 1310 around 90° has a large indentation 1410 on the ridge, as shown in FIGS. 14 and 15. FIG. 15 shows an enlarged view of the indentation 1410 shown in FIG. 14, which most likely occurred during installation of the gear.

Figure 16:
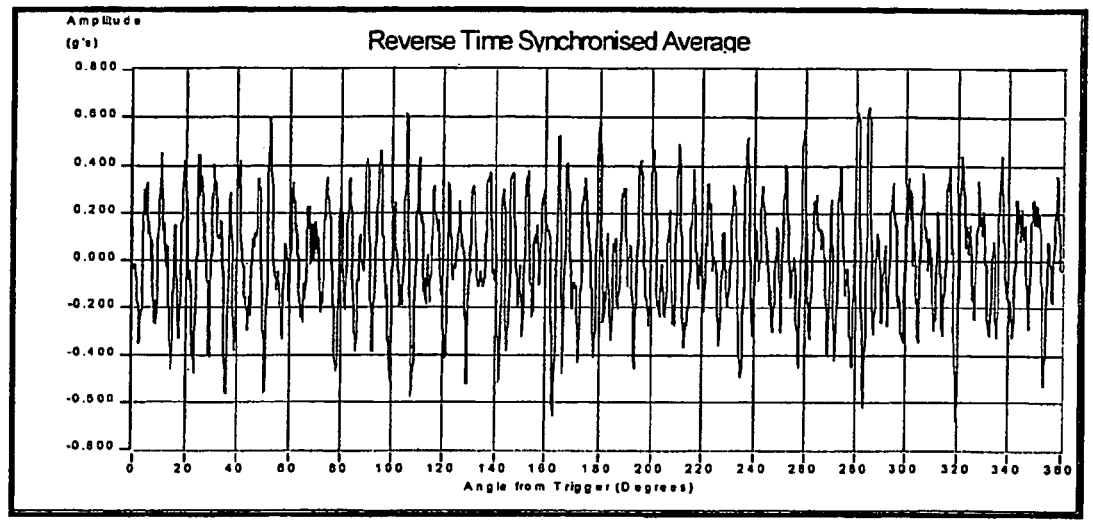
FIG. 16 is a plot of a TSA time waveform for the gear wheel represented in FIG. 13, after 500 averages, using data sampled from the drive end of the input shaft.

FIG. 16 shows the resulting TSA time waveform for the reversing direction, after 500 averages, with the accelerometer mounted in the vertical direction at the drive end of the shaft. As the gear is located towards the output side of the gear box, the TSA time waveform conducted on data collected above the output side bearing, as per FIG. 13, shows this fault more clearly. FIG. 16 shows the magnitudes as much smaller and less distinct.

Figure 17:
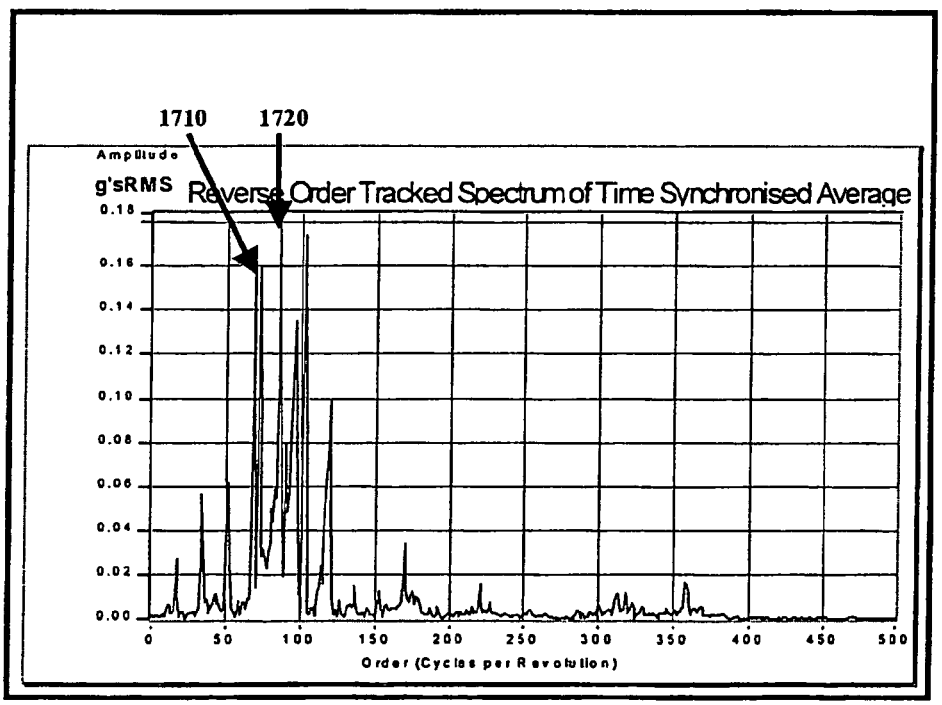
FIG. 17 is a plot of an Orders Spectrum waveform for the gear wheel represented in FIG. 13, after 500 averages, using data sampled from the output end of the input shaft.

The orders spectrum for gear 3 is shown in FIG. 17. It can be seen that the dominant meshing harmonics for gear 3 are the $4^{th}$ harmonic 1710 and the $5^{th}$ harmonic 1720 of the tooth meshing frequency. This explains why there are so many peaks, in fact there are between 4 and 5 peaks for each tooth. The tooth that corresponds to 180° also has a minor defect in that a very small spot exists where minor abrasive wear has occurred. It is further likely that there are defects on other teeth in the gearbox, as there are other definite spikes at 5° and 290°.

Convergence

The optimum number of Time Synchronised Averages corresponds to the minimum number of averages that are required to remove sufficient noise and non-synchronous vibrations and display the essential characteristics of the TSA time waveform. There is a trade off between the number of averages and the cost of data collection. Essentially the more averages that are collected, the longer it will take to collect the data and the greater the cost of performing the analysis will be. This is particularly the case with reversible drives as some data collected whilst the drive is decelerating, changing direction and then accelerating can not be processed.

In practice, the minimum acceptable number of averages will vary according to the characteristics of a particular machine. However, it has been shown that doubling the number of averages reduces the signal to noise ratio by a factor of $\sqrt{2}$. Thus, the minimum acceptable number of averages will also depend on the gearbox, itself, as the signal to noise ratio is different for every gearbox.

A known algorithm can be used to determine the number of averages necessary before the TSA time waveform begins to stabilise. The algorithm analyses a simplified correlation coefficient between the cumulative average (after N averages) and the cumulative average after N/2 averages, where N is generally every number of averages that is a power of 2. The algorithm is shown below:

Stop averaging if:

$$L > 1 - \frac{\sum_{j=N-50}^{N} x_{n,j} \times x_{n/2,j}}{\sum_{j=N-50}^{N} x_{n,j}^2}$$

where: L=leakage rate (by definition)
$x_{n,j}=j^{th}$ point in the current average at n revs
$x_{n/2,j}=j^{th}$ point in the average at n/2 revs
N=number of points in the average The algorithm was tested by conducting TSA on a noisy gearbox, as more averages are required for the case of a high signal to noise ratio. The algorithm predicted that convergence for a particular gear had occurred after 4 to averages. This was because after 4 averages the leakage factor was 0.037, which is less than a leakage factor of 0.05 as calculated according to the algorithm.

Figure 18:
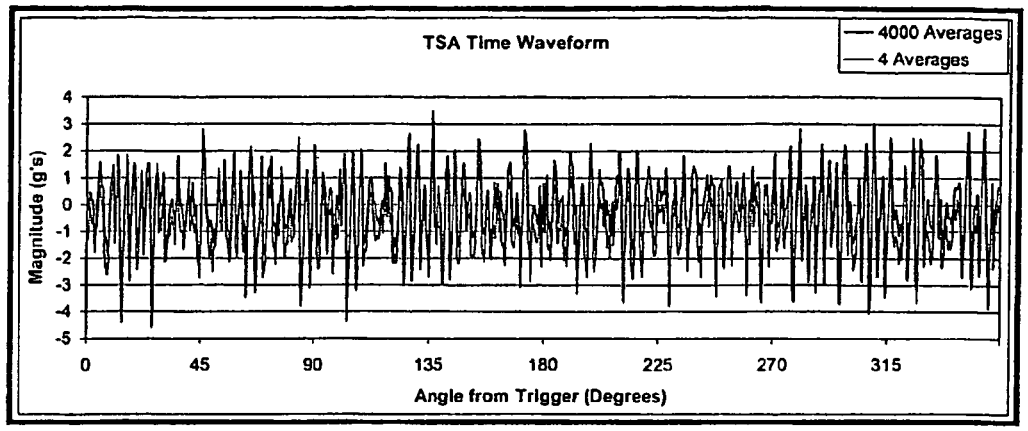
FIG. 18 is a plot of two superimposed TSA time waveforms, one after 4 averages and the other after 4000 averages.

FIG. 18 shows the TSA Time Waveforms for 4 averages and 4000 averages. A comparison of the waveforms indicates that the main characteristics are substantially the same. However, differences do exist, suggesting that the calculated leakage factor of 0.05 is too high and should be modified.

In order to determine a more appropriate leakage value, the TSA time waveform correlation coefficient between every average and the TSA after 4000 averages was calculated. As the TSA time waveform approaches that of the 4000 average TSA, the correlation coefficient will approach a value of one. How quickly this occurs indicates the effect each additional average has on the characteristics of the TSA time waveform.

Figure 19:
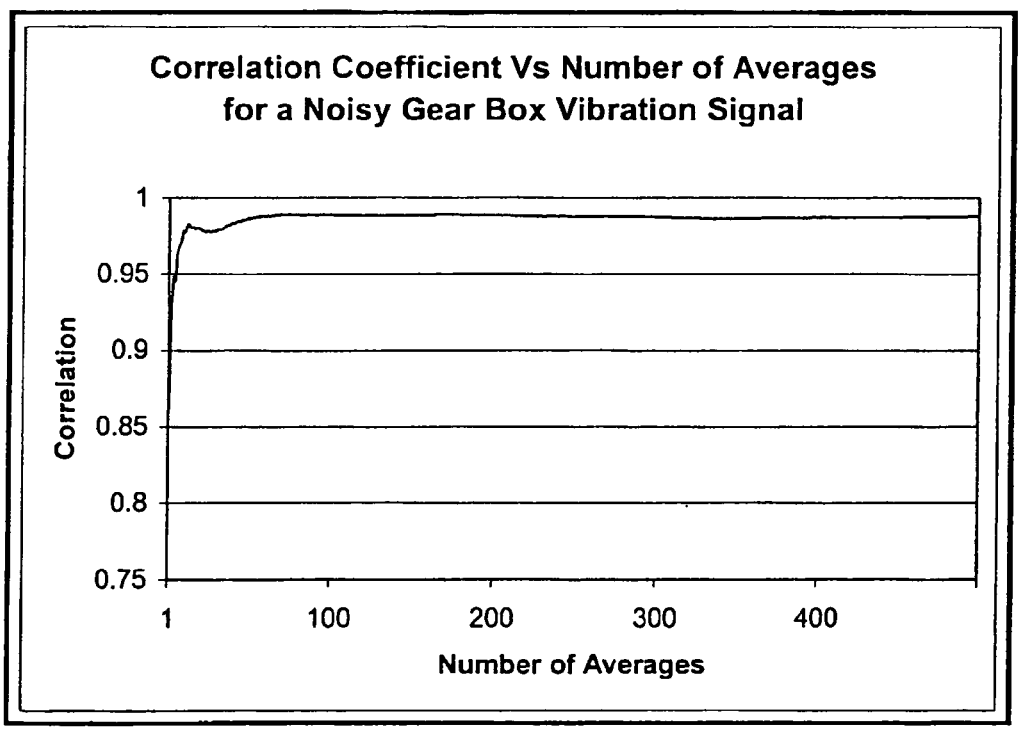
FIG. 19 is plot of the correlation coefficient between the TSA after 4000 averages and the TSA after the number of averages shown as the x-axis.

FIG. 19 shows a graph of the correlation coefficient versus the number of averages. The highest correlation coefficient achieved to three significant figures was 0.989. This occurred after 63 averages, thus suggesting the time waveform after 63 averages provides a very good representation of the characteristics of the gear.

Figure 20:
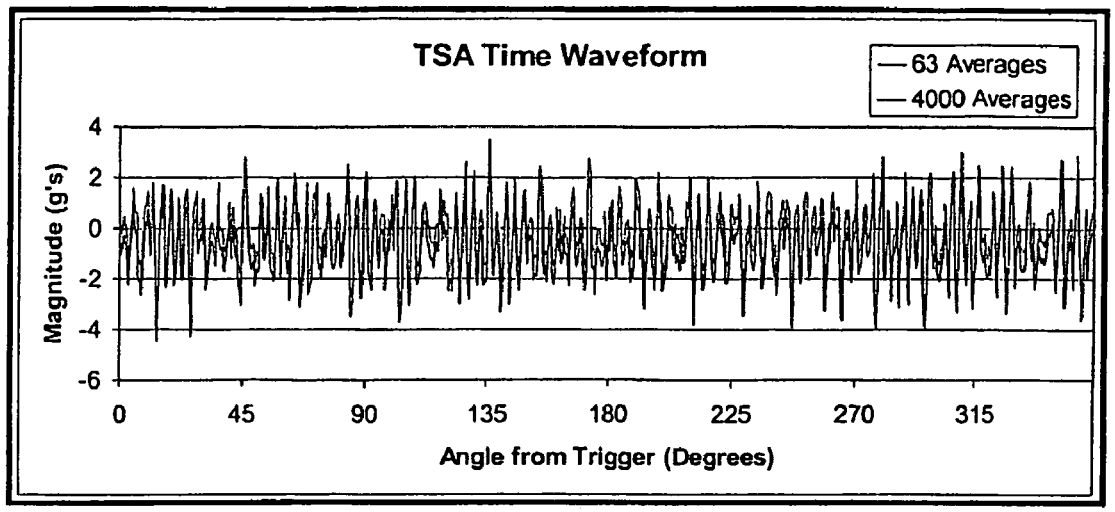
FIG. 20 is a plot of two superimposed TSA time waveforms, one after 63 averages and the other after 4000 averages.

FIG. 20 shows a plot of a TSA time waveform after 63 averages superimposed on a plot of a TSA time waveform after 4000 averages. FIG. 20 illustrates that the characteristics of the two time waveforms are essentially the same. The leakage factor after 63 averages is 0.0001. Thus, to achieve this level of accuracy, the leakage should be set to 0.0001.

The foregoing algorithm assumed that the mean for each set of data points was zero. This assumption was presumably made to simplify the calculation of the correlation coefficient and reduce the computation time. Whilst the foregoing algorithm only analysed the last 50 samples to allow for 'droop', the modified version described hereinafter uses all the sample points in the calculation to ensure that the correlation coefficient is affected by any deviations in the time waveform regardless of where the deviations occur. Furthermore, the modified version of the algorithm described hereinafter eliminates the assumption that the mean value for each set of data is zero.

Figure 21:
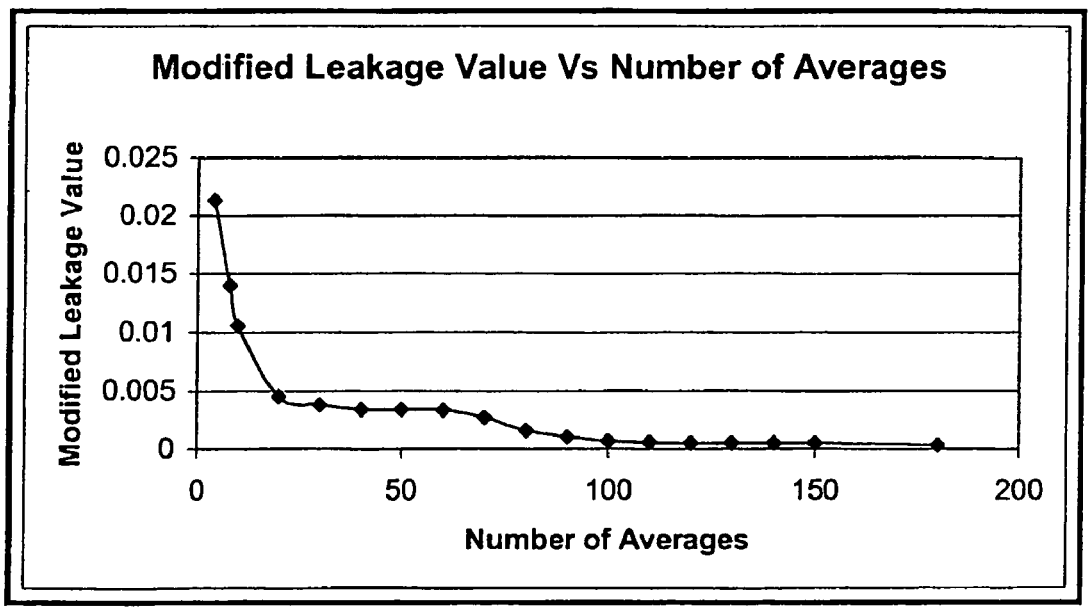
FIG. 21 is a plot of leakage value as a function of the number of averages, after application of a modified algorithm to determine the leakage values.

The modified version of the algorithm is as follows: Stop averaging if:

$$L > 1 - \frac{\sum_{j=1}^{N}(x_{n,j} - \overline{x_{n,j}}) \times (x_{n/2,j} - \overline{x_{n/2,j}})}{\sqrt{\sum_{j=1}^{N}(x_{n,j} - \overline{x_{n,j}})^2} \times \sqrt{\sum_{j=1}^{N}(x_{n/2,j} - \overline{x_{n/2,j}})^2}}$$

where: L=leakage rate (by definition), typically set to 0.05
$X_{n,j}=j$ th point in the current average (n revs)
$X_{n/2,j}=j^{th}$ point in the average at n/2 revs
N=number of points in the average FIG. 21 shows a plot of the leakage value versus the number of averages, using the modified version of the algorithm. It can clearly be seen this plot that, after 63 averages, the modified leakage factor is still improving, however, after 100 averages the modified leakage factor changes very little. Thus, the leakage factor that should be used with the modified version of the algorithm to ensure that optimum convergence has occurred is 0.0007, this value representing the leakage factor after 100 averages.

To confirm validity of the modified algorithm, an analysis of the mean magnitude difference was conducted. This involved calculating the mean difference between each data point and the corresponding data point after 4000 averages. This method demonstrates the difference in the magnitudes of the time waveforms but does not give a particularly good indication of how accurately the essential characteristics are displayed. The correlation coefficient is likely a better indicator, as in most cases it is more important that the characteristics are accurately shown than the magnitudes.

Figure 22:
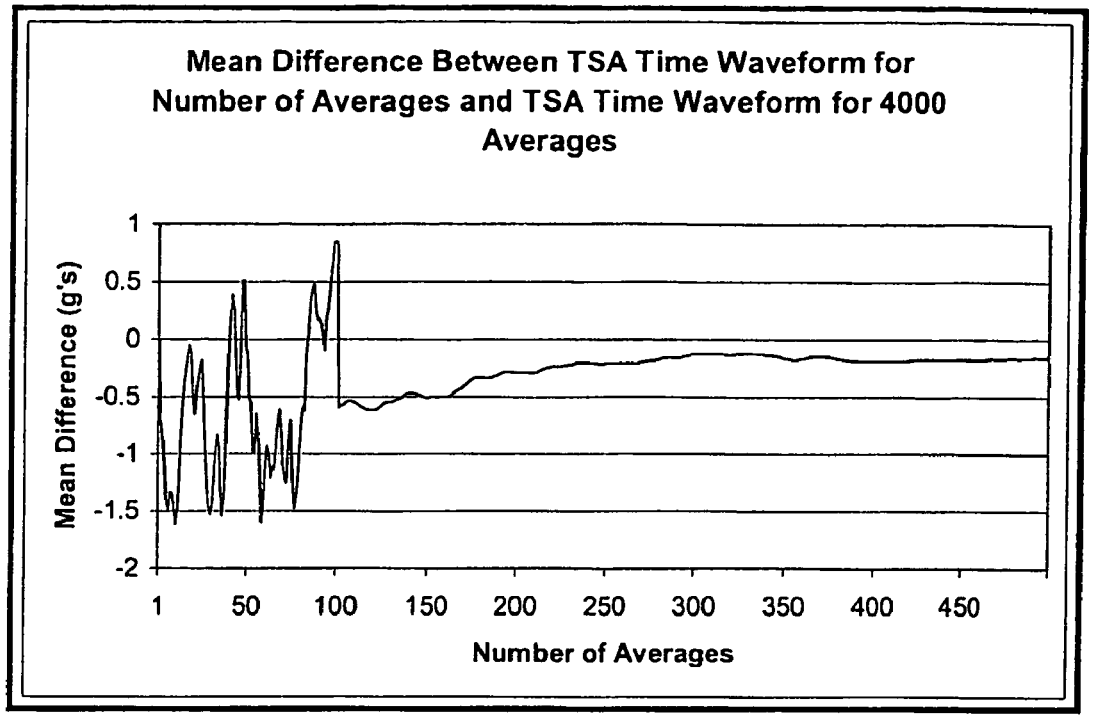
FIG. 22 is a plot of the mean difference in magnitude as a function of the number of averages.

FIG. 22 shows a graph of the mean difference in magnitude between the TSA time waveform of a varying number of averages and the TSA Time Waveform for 4000 averages. After 100 averages the mean magnitude difference has stabilised and is only −0.6 g's, whereas after 63 averages, the mean magnitude difference is still fluctuating at around −1.2 g's. The analysis of the mean difference suggests that, for this case, around 100 averages are sufficient to remove the majority of the noise and non-synchronous components.

Figure 23:
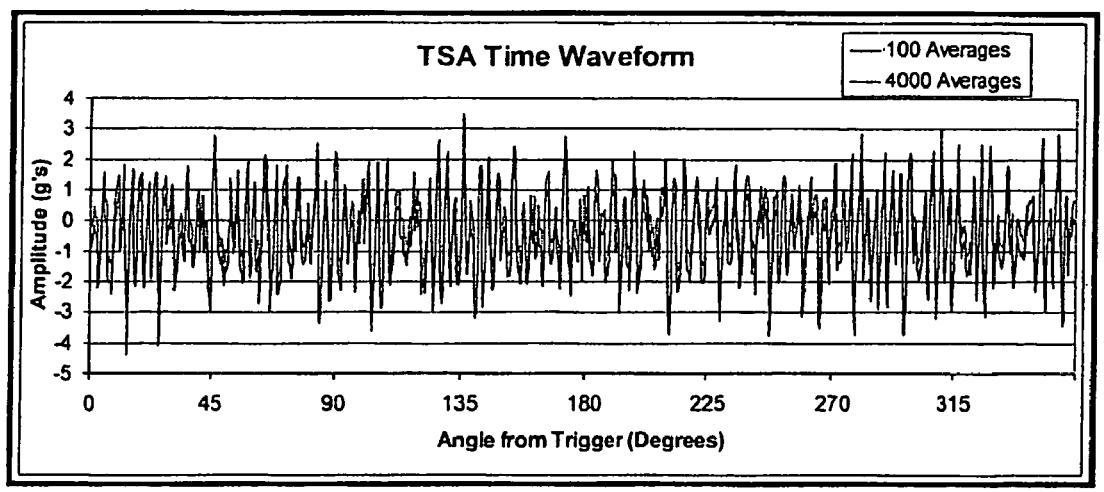
FIG. 23 is a plot of two superimposed TSA time waveforms, one after 100 averages and the other after 4000 averages.
Figure 24:
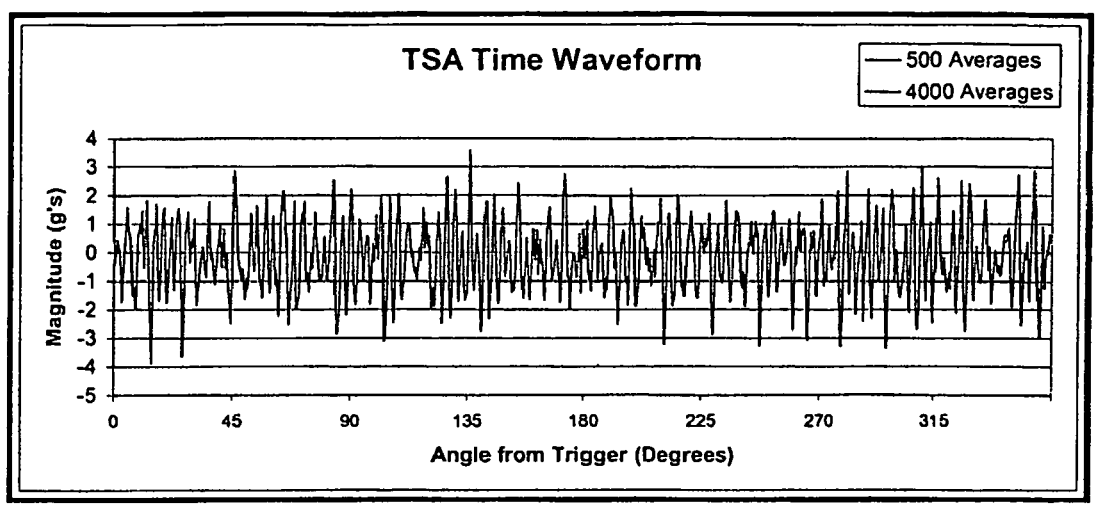
FIG. 24 is a plot of two superimposed TSA time waveforms, one after 500 averages and the other after 4000 averages.

FIG. 23 shows that the TSA time waveform from 100 averages accurately illustrates the gear signature, whilst showing a reasonable representation of the magnitudes when compared to a corresponding TSA waveform from 4000 averages. FIG. 24 shows that the TSA time waveform from 500 averages exhibits an even greater accuracy when compared to the corresponding TSA waveform from 4000 averages. The correlation coefficient between 500 averages and 4000 averages is 0.988 and the mean magnitude difference was −0.156 g's.

As discussed previously, the optimum number of averages required is dependent on the signal to noise ratio and the magnitude of non-synchronous components. These two factors are a function of the actual gearbox under evaluation. The optimum number of averages is therefore dependent on a specific gearbox and an analysis similar to that presented hereinafter should be conducted to determine the optimum number of averages for each individual gearbox.

Computer Implementation

Figure 25:
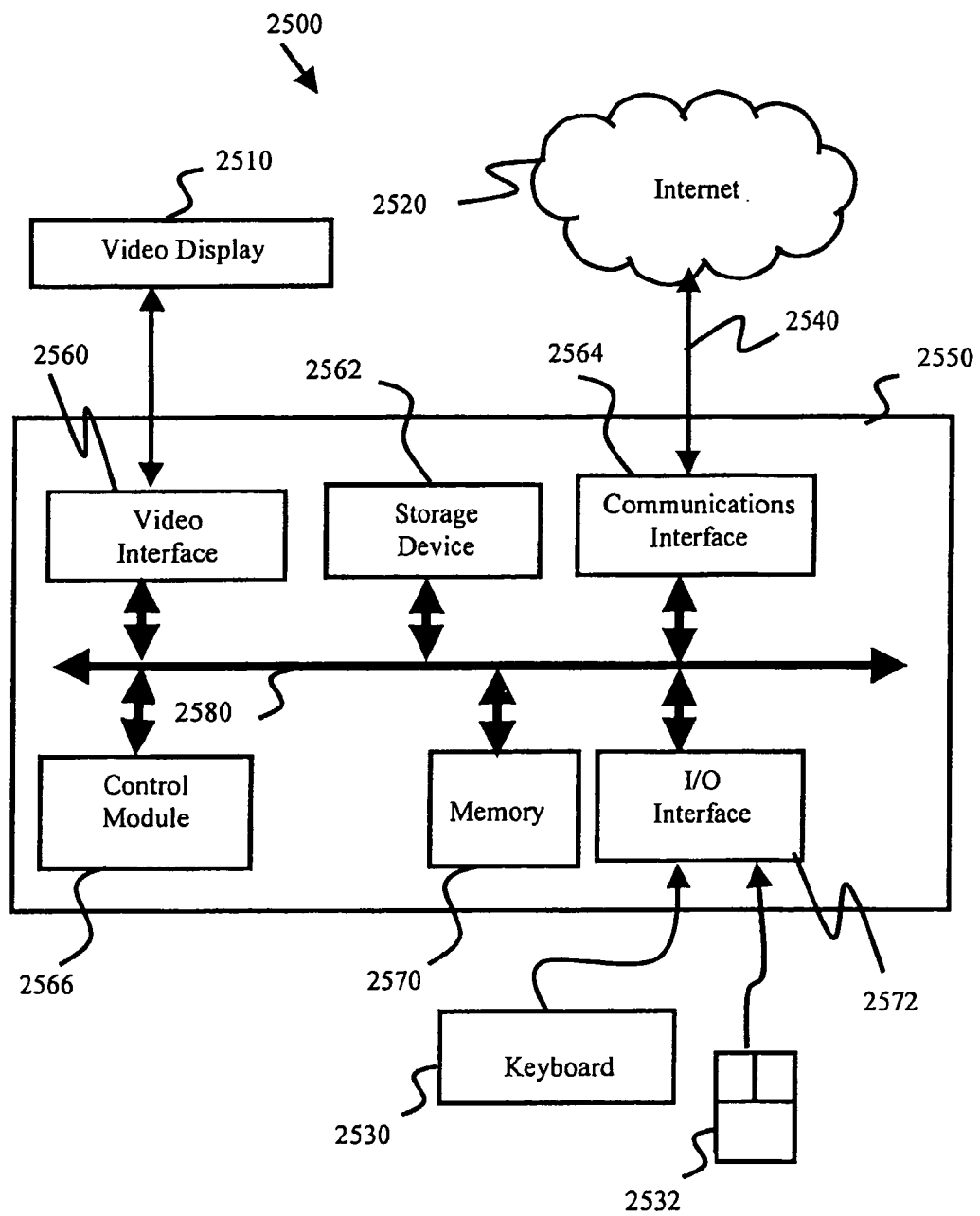
FIG. 25 is a block diagram of a computer system wherewith embodiments of the invention can be practiced.

The method for analysing vibrations of reversible drives can be implemented using a computer program product in conjunction with a computer system 2500 as shown in FIG. 25. In particular, the method for analysing vibrations of reversible drives can be implemented as software, or computer readable program code, executing on the computer system 2500.

The computer system 2500 includes a computer 2550, a video display 2510, and input devices in the form of a computer keyboard 2530 and a computer mouse 2532. In addition, the computer system 2500 can have any of a number of other output devices including line printers, laser printers, plotters, and other reproduction devices connected to the computer 2550. The computer system 2500 can be connected to one or more other computers via a communication interface 2564 using an appropriate communication channel 2540 such as a modem communications path, an electronic network, or the like. The network may include a local area network (LAN), a wide area network (WAN), an Intranet, and/or the Internet 2520.

The computer 2550 includes the control module 2566, a memory 2570 that may include random access memory (RAM) and read-only memory (ROM), communications interface 2564, input/output (I/O) interface 2572, a video interface 2560, and one or more storage devices generally represented by the storage device 2562. The control module 2566 is implemented using a central processing unit (CPU) that executes or runs a computer readable program code that performs a particular function or related set of functions.

The video interface 2560 is connected to the video display 2510 and provides video signals from the computer 2550 for display on the video display 2510. User input to operate the computer 2550 can be provided by one or more of the input devices 2530, 2532 via the I/O interface 2572. For example, a user of the computer 2550 can use a keyboard as I/O interface 2530 and/or a pointing device such as a mouse as I/O interface 2532. The keyboard and the mouse provide input to the computer 2550. The storage device 2562 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 2550 is typically connected to other devices via a bus 2580 that in turn can consist of data, address, and control buses.

A data acquisition module (not shown) can also be connected to the bus 2580, either directly or via the I/O interface 2572. The data acquisition module typically includes multiple input and output channels for simultaneously sampling input signals and delivering output signals.

The method steps for analysing vibrations of reversible drives are effected by instructions in the software that are carried out by the computer system 2500. Again, the software may be implemented as one or more modules for implementing the method steps.

In particular, the software may be stored in a computer readable medium, including the storage device 2562 or that is downloaded from a remote location via the interface 2564 and communications channel 2540 from the Internet 2520 or another network location or site. The computer system 2500 includes the computer readable medium having such software or program code recorded such that instructions of the software or the program code can be carried out.

The computer system 2500 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 2566. Intermediate storage of the program code and any data including entities, tickets, and the like may be accomplished using the memory 2570, possibly in concert with the storage device 2562.

In some instances, the program may be supplied to the user encoded on a CD-ROM or a floppy disk (both generally depicted by the storage device 2562), or alternatively could be read by the user from the network via a modem device connected to the computer 2550. Still further, the computer system 2500 can load the software from other computer readable media. This may include magnetic tape, a ROM or integrated circuit, a magneto-optical disk, a radio or infrared transmission channel between the computer and another device, a computer readable card such as a PCMCIA card, and the Internet 2520 and Intranets including email transmissions and information recorded on Internet sites and the like. The foregoing are merely examples of relevant computer readable media. Other computer readable media may be practised without departing from the scope and spirit of the invention.

The method for analysing vibrations of reversible drives can be realised in a centralised fashion in one computer system 2500, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

The foregoing describes only a few arrangements and/or embodiments of the present invention, and modifications and/or changes can be made thereto without departing from the scope and spirit of the invention, the arrangements and/or embodiments being illustrative and not restrictive.

TABLE 1

Arrival Times Script 1 function
[forward_averages,reverse_averages,final_sample_time,total_forward_arriv,total_reverse_arriv,minspeedout,arrtime,arrtime2]=
arrivaltimes(S1,S2,fs,avgsfwd,avgsrev,sr,begin_sample_time,
minspeedin)
% THIS PROGRAM CALCULATES THE ARRIVIL TIMES OF EACH TACHO
PULSE, THE NUMBER OF CONSTANT SPEED REVOLUTIONS AND THE
% MINIMUM SPEED TO DETERMINE THE MINIMUM NUMBER OF SAMPLE TABLE 1-continued Arrival Times Script 1

POINTS TO AVOID ALIASING
% THE DATA REQUIRED IS
% S1 = SIGNAL FROM HIGH QUALITY REFERENCE PULSE WHICH PULSES ONCE PER REVOLUTION
% S2 = SECOND SIGNAL WHICH CAN BE FROM A LOW QUALITY PULSE GENERATOR, IT IS USED TO DETERMINE DIRECTION.
% fs = THE SAMPLING RATE THE DATA WAS COLLECTED AT
% avgsfwd = THE NUMBER OF DESIRED FORWARD AVERAGES TO CALCULATE
% avgsrev = THE NUMBER OF DESIRED REVERSE AVERAGES TO CALCULATE
% sr = THE PERCENTAGE SPEED VARIATION ALLOWED BEFORE THE DATA IS DEEMED IN AN ACCELERATION OR DECELERATION ZONE
% begin_sample_time = THE SAMPLE TIME OF THE FIRST SAMPLE POINT IN THIS EXPORT TO MATLAB RELATIVE TO THE FIRST SAMPLE
% TIME IN THE RECORDED DATA SET
% minspeedin = THIS INPUTS THE MINIMUM SPEED FOUND FROM THE DATA ANALYSED SO FAR
S1=S1';
S2=S2';
DT=1/fs;
final_sample_time=length(S1)*DT+begin_sample_time;
%THIS SECTION COMPUTES THE ARRIVAL TIMES OF THE SHAFT PULSES
[arrtime] = arrtimes(S1,DT,begin_sample_time); %REFERENCE PULSE
[arrtime2] = arrtimes(S2,DT,begin_sample_time); % SECOND PULSE
- IT IS USED TO DETERMINE DIRECTION OF ROTATION
S1=[ ]; %This removes Matrix S1 from the memory after it has been used
S2=[ ]; %This removes Matrix S2 from the memory after it has been used
clear S1 S2; %This ensures the pulse time waveforms are removed from memory
%THIS SECTION SETS UP MATRICES TO BE USED TO DETERMINE ROTATIONAL SPEED AND ACCELERATING PERIODS
tsleft=[arrtime([1:length(arrtime)−2])]; %This is to remove the final pulse time so the matrix size is the same as tsright.
tsright=[arrtime([2:length(arrtime)−1])]; % to shift the matrix by one data point so we can look at the time difference between pulses.
testbottom=(tsright−tsleft)*(1−sr); %This is to determine lower limit of time per revolution variation before it is deemed to be accelerating
testtop=(tsright−tsleft)*(1+sr); % This is to determine the upper limit of time per revolution variation before it is deemed to be decelerating
testmid=tsright−tsleft; %This creates a matrix of the mid point of time per rev (speed) variation to be used as a comparator
clear tsleft tsright %This clears these values from memory
%This section simply intialises the variables
j=3; %this is done so the first 3 rotations are ignored.
i=3;
xref=1;. %this describes the location of the second pulse in the string of pulse times relative to the reference pulse
x=1; %this simply helps to located the second pulse in the string of pulse times relative to the reference pulse.
total_forward_arriv=[ ]; %this is to initialise the arrival matrix
total_reverse_arriv=[ ]; %this is to initialise the arrival matrix in the reverse direction
countspeed=0; %This is to keep track of the number of revolutions at each speed
speedfor=[ ]; %this sets the matrix of forward speeds to be empty
speedrev=[ ]; %this sets the matrix of reverse speeds to be empty
speed=[ ];
current_for_avgs=0; %This sets the current number of forward averages to zero
current_rev_avgs=0; %This sets the current number of reverse averages to zero
mean_forward_speed=[ ];
mean_reverse_speed=[ ];
forward_averages=[ ];
reverse_averages=[ ];

TABLE 1-continued

Arrival Times Script 1

```
% THIS IS SECTION OF THE PROGRAM ACTUALLY CALCULATES THE
CONSTANT VELOCITY SECTIONS AND DETERMINES THE
% NUMBER OF FORWARD CONSTANT SPEED REVOLUTIONS, THE NUMBER OF
REVERSE CONSTANT SPEED REVOLUTIONS AND
% THE MINIMUM SPEED
while ((2<j) & (j<(length(arrtime)-2)))
% THIS SECTION FIRST TESTS THAT IT IS ROTATING AT A CONSTANT
SPEED WITHIN THE ALLOWABLE VARIATION
i=j+1;
if ((testmid(j)<testtop(i)) & (testmid(j) > testbottom(i)));
countspeed=0;
speed=[ ];
%Now determine the period which it maintains this speed for
while ((testmid(j)<testtop(i)) & (testmid(j)>testbottom(i)) &
(i<(length(arrtime)-6)));
countspeed=countspeed+1;
speed(countspeed)=(1/testmid(i));
i=i+1; % to increase each step until no longer constant
velocity
end
if 3<(i-j) %THIS SIMPLY CUTS OUT ANY CONSECUTIVE CONSTANT
SPEED INFORMATION IF THE NUMBER OF REVOLUTIONS IS LESS THAN 3
%IT IS REQUIRED BECAUSE THE RESAMPLING PROGRAM REQUIRES
ATLEAST 3 ROTATIONS
if (x<length(arrtime2) & j<length(testmid) &
j<length(arrtime)) %This checks that the x and j values are
within the range available if they aren't
% then an error has occured and the break function will exit
the loop
% THIS FUNCTION CHECKS THE REFERENCE PULSE AND THE SECOND
PULSE ARE CORRECTLY REFERENCED TO DETERMINE DIRECTION
[xref,x,breaker]=refcheck(j,xref,testmid,arrtime,arrtime2);
else
break
end
if breaker= =0 %This checks to see if the location of the
second reference pulse could not be found
xref=1 %this is to set the reference position back to default
after being changed in the above section where no second pulse
existed
else
%THE FOLLOWING SECTION CHECKS IF THIS PIECE OF INFORMATION IS
IN THE FORWARD OR REVERSE DIRECTION
%AND THEN RESAMPLES AND PLACES THE DATA IN A MATRIX UNTIL THE
FINAL AVERAGING TAKES PLACE
T2=arrtime(j)-arrtime2(x)
T1=arrtime2(x)-arrtime(j)
if T2<T1 %THIS TEST IS TO SEE IF THE INFORMATION IS IN THE
FORWARD DIRECTION
if current_for_avgs<avgsfwd %This tests to see if the correct
number of averages will be reached in this sample section. If
they will it sets up the correct number of samples to give the
exact number of averages desired
if (i-j)>(avgsfwd-current_for_avgs);
i=j+(avgsfwd-current_for_avgs);
end
forward_arriv=[arrtime([j:i+1])];
total_forward_arriv=[total_forward_arriv forward_arriv]
speedfor=[speedfor speed]
new_forward_averages=(length(forward_arriv))-1
current_for_avgs=new_forward_averages+current_for_avgs
end
else % IF THE DATA WAS NOT IN THE FORWARD DIRECTION THEN BY
DEFAULT IT MUST BE REVERSE
if current_rev_avgs<avgsrev %This tests to see if the correct
number of averages will be reached in this sample section. If
they will it sets up the correct number of samples to give the
exact number of averages desired
if (i-j)>(avgsrev-current_rev_avgs);
i=j+(avgsrev-current_rev_avgs);
end
reverse_arriv=[arrtime([j:i])]
total_reverse_arriv=[total_reverse_arriv reverse_arriv];
speedrev=[speedrev speed];
end
end
end
```

TABLE 1-continued

Arrival Times Script 1

```
if (current_rev_avgs>avgsrev & current_for_avgs>avgsfwd)
break
end
end
j=i; %to set up test conditions for next iteration of constant
velocity tests
end
j=j+1; % TO INCREMENT TO THE NEXT SHAFT OF INTEREST ARRIVAL
TIME TO CHECK IF CONSTANT VELOCITY AND THEN REPEAT
end
clear testmid testbottom testtop %THIS CLEARS NO LONGER USED
VARIABLES
%THIS CALCULATES THE MINIMUM SPEED REVOLUTION AND EXPORTS IT
TO LABVIEW
if length(speedfor)>0
min_forward_speed=min(speedfor)
else
min_forward_speed=0.01
end
if length(speedrev)>0
min_reverse_speed=min(speedrev)
else
min_reverse_speed=0.01
end
if (min_forward_speed>0.01 & min_reverse_speed>0.01)
minspeedout=min(min_forward_speed,min_reverse_speed,
minspeedin)
else
if min_reverse_speed>0.01
minspeedout=min(min_reverse_speed,minspeedin)
end
if min_forward_speed>0.01
minspeedout=min(min_forward_speed,minspeedin)
end
if min_forward_speed<=0.01 & min_reverse_speed<=0.01
minspeedout=minspeedin
end
end
forward_averages=length(total_forward_arriv)
reverse_averages=length(total_reverse_arriv)
```

TABLE 2

Arrival Times Script 2 - Function used in Arrival Times 1

```
function [arrtime] = arrtimes(S,DT,begin_sample_time)
% THIS FUNCTION CALCULATES THE ARRIVAL TIMES OF THE REFERENCE
SHAFT GIVEN THE TIME
% WAVEFORM CONTAINING THE PULSES FROM A PULSE GENERATOR
% S = THE TIME WAVEFORM CONTAINING THE PULSES GENERATED EACH
REVOLTUTION.
% DT = THE SAMPLING TIME DT=1/Fs WHERE Fs IS THE SAMPLING
FREQUENCY
% arrtime = IS THE MATRIX OF ARRIVAL TIMES OF THE REFERENCE
SHAFT
% This sets the intercept value
tmax = max(S);
if tmax>0.3 %This is just in case the pulse is smaller than
0.3 volts
intercept=0.3;
else
intercept=0.2*tmax
end
% Now Create matrix Sright, which is exactly the same as S but
time shifted by one data point to the right
Sright = [S(1); S([1:length(S)-1))];
% THE TIMES AT WHICH THE PULSE TIME WAVEFORM CROSSES THE
INTERCEPT ARE CALCULATED
init = find(S>intercept & Sright<intercept);
% A SHORT MATRIX WITH POINTS EITHER SIDE OF THOSE DETERMINED
IN INIT ABOVE IS SET UP.
% THE TIMES (WHICH RELATE TO A SAMPLE) ARE THEN INTERPOLATED
if length(init)>0 %Only conducts the analysis if some arrival
times to interpolate
```

TABLE 2-continued

Arrival Times Script 2 - Function used in Arrival Times 1

```
if init(1)>2 & (init(length(init))+2)<length(S) %This
statement ensures there is enough data
for k=1:(length(init)); %This if statement just ensures there
are enough data points
if or((S(init(k))<S(init(k)+1)),(S(init(k))>S(init(k)+1)))
%This ensures no two points are the same because if they are
the spline function does not work
y = [S(init(k)–3);S(init(k)–2);S(init(k)–
1);S(init(k));S(init(k)+1);S(init(k)+2);S(init(k)+3)];
x = [(init(k)–3)*DT;(init(k)–2)*DT;(init(k)–
1)*DT;init(k)*DT;(init(k)+1)*DT;(init(k)+2)*DT;
(init(k)+3)*DT];
arrtime(k) = interp1q(y,x,intercept); %THIS IS THE MATRIX OF
ARRIVAL TIMES (SECONDS)
end
end
else %This reduces the end points if such a situation exists
where they do not exist
for k=3:(length(init)–2)
y = [S(init(k)–3);S(init(k)–2);S(init(k)–
1);S(init(k));S(init(k)+1);S(init(k)+2);S(init(k)+3)];
x = [(init(k)–3)*DT;(init(k)–2)*DT;(init(k)–
1)*DT;init(k)*DT;(init(k)+1)*DT;(init(k)+2)*DT;
(init(k)+3)*DT];
arrtime(k) = interp1q(y,x,intercept); %THIS IS THE MATRIX OF
ARRIVAL TIMES (SECONDS)
end
end
arrtime=arrtime+begin_sample_time;
end
if length(init)<1
arrtime=[ ] %This gives an empty matrix if no arrival times
exist, it avoids error messages
end
clear tmax S intercept Sright init x y
```

TABLE 3

Shaft Of Interest Arrival Time Script

```
function [shoiarrtime] =
shoiarrtime (arrtime,REF_TO_INTEREST_RATIO)
% THIS FUNCTION CALCULATES THE ARRIVAL TIMES OF THE SHAFT OF
INTEREST GIVEN THE CYCLE TIMES OF THE REFERENCE SHAFT
% REF_TO_INTEREST_RATIO = IS THE FIXED VELOCITY RATIO BETWEEN
THE PULSE GENERATING REFERENCE SHAFT AND THE SHAFT OF INTEREST
% eg reference shaft:shaft of interest => 1:20 =>
REF_TO_INTEREST_RATIO=20
% arrtime = IS THE MATRIX OF ARRIVAL TIMES OF THE REFERENCE
SHAFT
% shoiarrtime = THE ARRIVAL TIMES OF THE SHAFT OF INTEREST
arrtime(1)=[ ];%this removes the first arrival point in the
reference pulse
% CREATING A MATRIX OF REFERENCE .SHAFT CYCLES
refcyc = 0:1:(length(arrtime)–1);
% NOW CREATE A MATRIX OF CYCLES FOR THE SHAFT OF INTEREST
BASED UPON REFERENCE SHAFT CYCLES
soicycle = 0:REF_TO_INTEREST_RATIO:(length(arrtime)–1);
%starts from 1 to ensure no errors from one pulse comming
before the other
% USE INTERP1 TO RETURN A MATRIX CONTAINING THE ARRIVAL TIMES
OF THE SHAFT OF INTEREST
shoiarrtime = interp1(refcyc,arrtime,soicycle,'linear');
shoiarrtime=shoiarrtime(1:length(shoiarrtime)–1); %This
removes the part revolution on the end.
clear refcyc soicycle
clear arrtime arrtime2 refcyc2 soicycle2
```

TABLE 4

Resampling Vibration Data Into Forward And Reverse Direction Script

```
function
[mean_forward_speed,mean_reverse_speed,forward_averages,
reverse_averages,vtotalforward,vtotalreverse,finalsampletime] =
labviewresample(vib,fs,n,avgsfwd,avgsrev,sr,arrtime,arrtime2,
beginsampletime);
% THIS PROGRAM RESAMPLES THE CONSTANT SPEED REVOLUTIONS DATA
INTO THE ANGLE DOMAIN
% THE FORWARD AND REVERSE DATA ARE APPENDED INTO SEPARATE
MATRIX SO THE RESULT IS
% A FORWARD CONTINUOUS ANGLE DOMAIN DATA SET AND A REVERSE
CONTINOUS ANGLE DOMAIN DATA SET
% THE DATA REQUIRED IS;
% vib = THE SIGNAL CONTAINING THE VIBRATION INFORMATION EG
FROM ACCELEROMETER
% fs = THE SAMPLING TIME RATE
% n = THE NUMBER OF SAMPLE POINTS PER REVOLUTION.
% avgsfwd = THE NUMBER OF DESIRED FORWARD AVERAGES TO
CALCULATE
% avgsrev = THE NUMBER OF DESIRED REVERSE AVERAGES TO
CALCULATE
% sr = THE PERCENTAGE SPEED VARIATION ALLOWED BEFORE THE DATA
IS DEEMED IN AN ACCELERATION OR DECELERATION ZONE
% begin_sample_time = THE SAMPLE TIME OF THE FIRST SAMPLE
POINT IN THIS EXPORT TO MATLAB RELATIVE TO THE FIRST SAMPLE
% arrtime = THE MATRIX OF ARRIVAL TIMES FOR PULSE 1
% arrtime2 = THE MATRIX OF ARRIVAL TIMES FOR PULSE 2
DT=1/fs;
finalsampletime=(length(vib)*DT)+beginsampletime; %This
determines the final sample time to be used as the beginning
sample time in the next iteration
%THIS SECTION SETS UP MATRIX TO BE USED TO DETERMINE
ROTATIONAL SPEED AND ACCELERATING PERIODS
tsleft=[arrtime([1:length(arrtime)-2])]; %to remove the final
pulse time so the matrix size is the same as tsright.
tsright=[arrtime([2:length(arrtime)-1])]; % to shift the
matrix by one data point so we can look at the time difference
between pulses.
testbottom=(tsright-tsleft)*(1-sr); %lower limit of time per
revolution variation before it is determined to be
accelerating
testtop=(tsright-tsleft)*(1+sr);%upper limit of time per
revolution variation before it is decided that the shaft is
accelerating
testmid=tsright-tsleft; %mid point of time per rev (speed)
variation to be used as a comparator
clear tsleft tsright
% CREATE A MATRIX OF PULSE TIMES FOR THE ORIGINAL VIBRATION
DATA
TIME = beginsampletime:DT:finalsampletime; %In the final
program with recorded information this sets up the time
matrix, here it simply replaces the previously calculated TIME
values in tsa   it is set from DT on because the arrival time
function treats the first point as dt
%This section simply intialises the variables
j=3; %This is done so the first 3 rotations are ignored.
i=3;
xref=1; %This describes the location of the second pulse in
the string of pulse times relative to the reference
pulse.vtotalforward=[ ];%sets the initial forward matrix to be
an empty matrix
x=1; %This simply helps to located the second pulse in the
string of pulse times relative to the reference pulse.
vtotalreverse=[ ]; %Sets the initial reverse matrix to be an
empty matrix
vtotalforward=[ ]; %Sets the initial forward matrix to be an
empty matrix
countspeed=0; %This is to keep track of the number of
revolutions at each speed
speedfor=[ ];
speedrev=[ ];
speed=[ ];
current_for_avgs=0;
current_rev_avgs=0;
mean_forward_speed=[ ];
mean_reverse_speed=[ ]; %this is just to have matlab recognise
the variable in the case where there is no reverse
information.
```

TABLE 4-continued

Resampling Vibration Data Into Forward And Reverse Direction Script

```
forward_averages=[ ];
reverse_averages=[ ];
% THIS IS SECTION OF THE PROGRAM ACTUALLY CALCULATES THE
CONSTANT VELOCITY SECTIONS AND SEPARATELY RECORDS THE FORWARD
% AND THE REVERSE INFORMATION
while ((2<j) & (j<(length(arrtime)-2)))
%FIRST TEST THAT IT IS ROTATING AT A CONSTANT SPEED WITHIN THE
ALLOWABLE VARIATION
i=j+1;
if ((testmid(j)<testtop(i)) & (testmid(j) > testbottom(i)));
countspeed=0;
speed=[ ];
%Now determine the period which it maintains this speed for
while ((testmid(j)<testtop(i)) & (testmid(j)>testbottom(i)) &
(i<(length(arrtime)-6)));
countspeed=countspeed+1;
speed(countspeed)=(1/testmid(i));
i=i+1; % To increase each step until no longer constant
velocity
end
if 3<(i-j) %THIS SIMPLY CUTS OUT ANY CONSECUTIVE CONSTANT
SPEED INFORMATION IF THE NUMBER OF REVOLUTIONS IS LESS THAN 3
%IT IS REQUIRED BECAUSE THE RESAMPLING PROGRAM REQUIRES
ATLEAST 3 ROTATIONS
if (x<length(arrtime2) & j<length(testmid) &
j<length(arrtime)) %This checks that the x and j values are
within the range available if they aren't
%then an error has occured and the break function will exit
the loop
% THIS FUNCTION CHECKS THE REFERENCE PULSE AND THE SECOND
PULSE ARE CORRECTLY REFERENCED TO DETERMINE DIRECTION
[xref,x,breaker]=refcheck(j,xref,testmid,arrtime,arrtime2);
else
break
end
if breaker= =0 %This checks to see if the location of the
second reference pulse could not be found
xref=1 %this is to set the reference position back to default
after being changed in the above section where no second pulse
existed
else
%THE FOLLOWING SECTION CHECKS IF THIS PIECE OF INFORMATION IS
IN THE FORWARD OR REVERSE DIRECTION
%AND THEN RESAMPLES AND PLACES THE DATA IN A MATRIX
T2=arrtime(j)-arrtime2(x)
T1=arrtime2(x)-arrtime(j)
if T2<T1 %THIS TEST TO SEE IF THE INFORMATION IS IN THE
FORWARD DIRECTION
%This tests to see if the correct number of averages will be
reached in this sample section. If they will it sets up the
correct number of samples to give the exact number of averages
desired
if current_for_avgs<avgsfwd
if (i-j)>(avgsfwd-current_for_avgs);
i=j+(avgsfwd-current_for_avgs);
end
if (length(vib)>((max(testmid))*fs*2)) %THis is just a trial
to check but essentially it is trying to avoid resample if not
enough information ther must be atleast two revolutions of
information in this test
%THIS FUNCTION RESAMPLES THE INFORMATION AND PLACES IT IN A
MATRIX CONTAINING THE FORWARD INFORMATION ONLY
[vibforwardnew] = resample(arrtime,j,i,DT,n,TIME,vib);
%THIS SIMPLY ADDS THE CURRENT FORWARD DATA TO PREVIOUSLY
COLLECTED FORWARD DATA
vtotalforward=[vtotalforward vibforwardnew];
current_for_avgs = (length(vtotalforward))/n;
speedfor=[speedfor speed];
end
end
else
%This tests to see if the correct number of averages will be
reached in this sample section. If they will it sets up the
correct number of samples to give the exact number of averages
desired
if current_rev_avgs<avgsrev
if (i-j)>(avgsrev-current_rev_avgs);
```

TABLE 4-continued

Resampling Vibration Data Into Forward And Reverse Direction Script

```
i=j+(avgsrev−current_rev_avgs);
end
if (length(vib)>((max(testmid))*fs*2)) %This avoids
resampling if not enough information
%THIS FUNCTION RESAMPLES THE INFORMATION AND PLACES IT IN A
MATRIX CONTAINING THE REVERSE INFORMATION ONLY
[vibreversenew] = resample(arrtime,j,i,DT,n,TIME,vib);
%THIS SIMPLY ADDS THE CURRENT REVERSE DATA TO PREVIOUSLY
COLLECTED REVERSE DATA
vtotalreverse=[vtotalreverse vibreversenew];
current_rev_avgs = (length(vtotalreverse))/n;
speedrev=[speedrev speed];
end
end
end
end
clear vibforwardnew vibreversenew
if (current_rev_avgs>avgsrev & current_for_avgs>avgsfwd)
break
end
end
j=i; %to set up test conditions for next iteration of constant
velocity tests
end
j=j+1; % TO INCREMENT TO THE NEXT SHAFT OF INTEREST ARRIVAL
TIME TO CHECK IF CONSTANT VELOCITY AND THEN REPEAT
end
%THIS GIVES SOME USEFUL INFORMATION WITH REGARD TO AVERAGE
ROTATIONAL SPEED OF DATA ANALSYSED
if length(speedfor)>0
mean_forward_speed=mean(speedfor)
end
if length(speedrev)>0
mean_reverse_speed=mean(speedrev)
end
sizefor=length(vtotalforward);%THIS LINE GETS THE SIZE OF THE
vtotalreverse MATRIX
% %THIS TESTS THE SIZE OF THE vtotalreverse MATRIX TO SEE IF
THERE IS ANY REVERSE INFORMATION
if sizefor>0
forward_averages=sizefor/n;
if forward_averages<avgsfwd
'The maximum number of forward averages that can be computed
with the given data is'
forward_averages
else
'The number of forward averages computed is'
forward_averages
end
else %THIS SIMPLY GIVES A MESSAGE IF NO FORWARD INFORMATION
'There is no forward information'
forward_averages=0;
end
sizerev=length(vtotalreverse); %THIS LINE GETS THE SIZE OF
THE vtotalreverse MATRIX
% %THIS TESTS THE SIZE OF THE vtotalreverse MATRIX TO SEE IF
THERE IS ANY REVERSE INFORMATION
if sizerev>0
reverse_averages = sizerev/n;
if reverse_averages<avgsrev
'The maximum number of reverse averages that can be computed
with the given data is'
reverse_averages
else
'The number of reverse averages computed is'
reverse_averages
end
else %THIS SIMPLY GIVES A MESSAGE IF NO REVERSE INFORMATION
'There is no reverse information'
reverse_averages=0;
end
```

TABLE 5

Pulse Reference Check Script

```
function
[xref,x,breaker]=refcheck(j,xref,testmid,tsoicl,tsoic2)
% THIS FUNCTION CHECKS THE REFERENCE PULSE AND THE SECOND
PULSE ARE CORRECTLY REFERENCED TO DETERMINE THE DIRECTION OF
ROTATION
%This is used to tell the main program to move on to the next
arrival time of the shaft because if the reference arrival
time does not have a corresponding second pulse
breaker=1;
%This sets up the initial reference position which is usually
one position behind
x=j-xref;
%This simply ensures that x is not less than one
if x<1
x=1; %This just initialises x to 1 if it is less than 1
end
% THIS FINDS THE REFERENCE OF THE SECOND PULSE RELATIVE TO THE
FIRST
if (((abs((testmid(j))))/2)<(abs(tsoic1(j)-tsoic2(x)))) %This
is the test to determine if the two pulses are consecutive
if j>10
x=j-9-xref; %This goes back 11 positions and searches for the
correct reference position
end
if j<10
x=1; %This goes back to the begining of the matrix and
searches for the reference position if j is less than 10
end
while ((abs(testmid(j)/2))<((abs(tsoic1(j)-tsoic2(x)))))
%This section checks 2 pulses either side to find the correct
pulse to reference
x=x+1;
if x>(length(tsoic2))
x=1;
while (((abs((testmid(j))))/2)<(abs(tsoic1(j)-tsoic2(x))))
x=x+1;
if x>(j-xref) %When x reaches this value all the values of x
have been checked
breaker=0; %This is used to send a signal back to the main
program to break out of the while loop
'1AN ERROR OCCURED IN YOUR DATA COLLECTION, THERE IS NO
CORRESPONDING SECOND REFERENCE PULSE TO DETERMINE DIRECTION OF
ROTATION'
break
end
end
end
if breaker= =0
test=10
break
end
end
end
x
xref=j-x %This keeps track of the relative position of the
second pulses time
```

TABLE 6

Resampling Script

```
function [vibresamplednew] =
resample(shoiarrtime,j,i,DT,N,TIME,VIB)
% THIS FUNCTION DETERMINES
THE RESAMPLE TIMES THAT THE
ORIGINAL VIBRATION INFORMATION
MUST BE RESAMPLED AT
% TO GIVE N SAMPLES PER REVOLUTION
IN THE ANGLE DOMAIN
% shoiarrtime = THE MATRIX OF ARRIVAL
TIMES OF THE SHAFT OF
INTEREST
% DT = SAMPLING INTERVAL
```

TABLE 6-continued

Resampling Script

```
% N = THE NUMBER OF SAMPLES
POINTS REQUIRED FOR EVERY
REVOLUTION OF THE SHAFT OF INTEREST
% FOR FASTEST COMPUTATIONAL TIMES
IT IS BEST THAT N IS A
POWER OF 2
% THIS SETS UP A MATRIX OF ARRIVAL
TIMES THAT RELATE TO THIS
BLOCK OF FORWARD OR REVERSE INFORMATION
arrtime=[shoiarrtime([j:i])];
% THIS SETS UP VIBRATION MATRIX
AND TIME MATRIX CONTAINING
```

TABLE 6-continued

Resampling Script

```
ONLY THE DATA OF INTEREST
test1=find(TIME>shoiarrtime(j-1) &
TIME<shoiarrtime(i+1));
VIB1=VIB(test1);
TIME1=TIME(test1);
% THIS SETS UP A DUMMY MATRIX OF
POINTS RELATING TO EACH
REQUIRED SAMPLE (N for every rotation)
dummy=1:(1/N):length(arrtime);
% THIS SETS UP A MATRIX OF POINTS
WHICH CORRESPOND TO THE
ARRIVAL TIMES MATRIX
arrivalpoints = 1:1:length(arrtime);
% THIS INTERPOLATES TO FIND THE RESAMPLE TIMES
resamptimes=interp1(arrivalpoints,
arrtime,dummy,'linear');
% THIS RESAMPLES THE VIBRATION
DATA AT THE RESAMPLE TIMES
vibresampled = interp1(TIME1,
VIB1,resamptimes,'cubic');
% THIS IS TO GET RID OF EXTRA
POINT ON THE END OF
INTERPOLATION THAT RESAMPLING CREATES
vibresamplednew=[vibresampled
([1:length(vibresampled)-1])];
clear arrtime dummy arrivalpoints
resamptimes vibresampled
```

TABLE 7

Kurtosis Calculation Script

```
function [K]=kurtosis(n,tsa)
%THIS FUNCTION COMPUTES THE KURTOSIS
VALUE FOR THE TIME
SYNCHRONOUS AVERAGE
avgetsa=mean(tsa);
for x=1:n
XM(x)=(tsa(x)-avgetsa)^4;
end
s=std(tsa);
K=(sum(XM))/(n*(s^4));
```

We claim:

1. A system for detecting vibration signatures in a reversible drive comprising:
    transducer means for acquiring digital data representative of vibrations in said reversible drive;
    processor means for identifying portions of said data; and
    processor means for grouping together said identified portions of data in a plurality of groups;
    wherein each of said identified portions of data relate to a particular direction of travel of said reversible drive and said plurality of groups relate to different directions of travel of said reversible drive.

2. A computer program product having a computer readable medium having a computer program recorded therein for detecting vibration signatures in a reversible drive, wherein said computer program product comprises:
    computer program code means for acquiring digital data representative of vibrations in said reversible drive;
    computer program code means for identifying portions of said data; and
    computer program code means for grouping together said identified portions of data in a plurality of groups;
    wherein each of said identified portions of data relate to a particular direction of travel of said reversible drive and said plurality of groups relate to different directions of travel of said reversible drive.

3. A method for detecting vibration signatures in a rotating and/or cyclic machinery comprising the steps of:
    acquiring digital data representative of vibrations in the machinery, wherein the data includes data acquired at different speeds of the machinery;
    identifying portions of the data relating to a predetermined speed and acceleration range of the machinery and for identifying portions of the data outside the predetermined speed and acceleration range, wherein a processor means is used for identifying the portions of the data; and
    grouping together the identified portions of data relating to the predetermined speed and acceleration range in a group relating to data in the predetermined speed and acceleration range, by appending successive portions to an accumulation of previous data portions also relating to the predetermined speed and acceleration range.

4. A system for detecting vibration signatures in a rotating and/or cyclic machinery comprising:
    transducer means for acquiring digital data representative of vibrations in the machinery;
    processor means for identifying portions of said data relating to a predetermined speed and acceleration range of the machinery and for identifying portions of the data outside the predetermined speed and acceleration range; and
    processor means for grouping together said identified portions of data relating to the predetermined speed and acceleration range in a group relating to data in the predetermined speed and acceleration range by appending successive portions to an accumulation of previous data portions also relating to the predetermined speed and acceleration range.

5. A computer program product having a computer readable medium having a computer program recorded therein for detecting vibration signatures in a rotating and/or cyclic machinery, said computer program product comprising:
    computer program code means for acquiring digital data representative of vibrations in the machinery;
    computer program code means for identifying portions of said data relating to a predetermined speed and acceleration range of the machinery and for identifying portions of the data outside the predetermined speed and acceleration range; and
    computer program code means for grouping together said identified portions of data relating to the predetermined speed and acceleration range in a group relating to data in the predetermined speed and acceleration range by appending successive portions to an accumulation of previous data portions also relating to the predetermined speed and acceleration range.

6. A method for detecting vibration signatures in a reversible drive, said method comprising the steps of:
    acquiring digital data representative of vibrations in said reversible drive;
    identifying portions of said data using a processor means; and
    grouping together said identified portions of data in a plurality of groups;
    wherein each of said identified portions of data relate to a particular direction of travel of said reversible drive and said plurality of groups relate to different directions of travel of said reversible drive;
    wherein grouping together identified portions of data relating to a particular direction of travel is done by appending successive portions to an accumulation of previous data portions also relating to the particular direction.

7. The method of claim 6 wherein the reversible drive changes its direction of travel while the data is acquired.

8. The method of claim 6 wherein said identified portions of data are representative of substantially constant speed of operation of said reversible drive.

9. The method of claim 6 wherein said digital data includes data sampled at a fixed time interval sampling rate.

10. The method of claim 6 further comprising the step of processing at least one of said groups of identified portions of data to produce data representative of one or more vibration signatures.

11. The method of claim 6 wherein the identified portions of data in the forward and reverse directions of travel are separated.

12. A method for detecting vibration signatures in a reversible drive, said method comprising the steps of:
    acquiring digital data representative of vibrations in said reversible drive;
    identifying portions of said data using a processor means; and
    grouping together said identified portions of data in a plurality of groups;
    wherein each of said identified portions of data relate to a particular direction of travel of said reversible drive and said plurality of groups relate to different directions of travel of said reversible drive;
    wherein each successive sample of each of said one or more groups of identified portions of data corresponds to a successive sample position of said reversible drive.

13. A method for detecting vibration signatures in a reversible drive, said method comprising the steps of:
    acquiring digital data representative of vibrations in said reversible drive;
    identifying portions of said data using a processor means; and
    grouping together said identified portions of data in a plurality of groups;
    wherein each of said identified portions of data relate to a particular direction of travel of said reversible drive and said plurality of groups relate to different directions of travel of said reversible drive;
    wherein said digital data includes data sampled at a variable sampling rate synchronized to the speed of said reversible drive.

14. A method for detecting vibration signatures in a reversible drive, said method comprising the steps of:
    acquiring digital data representative of vibrations in said reversible drive;
    identifying portions of said data using a processor means; and
    grouping together said identified portions of data in a plurality of groups;
    wherein each of said identified portions of data relate to a particular direction of travel of said reversible drive and said plurality of groups relate to different directions of travel of said reversible drive;
    wherein said digital data includes data sampled at a fixed time interval sampling rate; further comprising the step of resampling said digital data, wherein each successive sample of the resampled digital data corresponds to a successive position of said reversible drive and the distance between each of said successive positions is a constant amount.

15. A method for detecting vibration signatures in a reversible drive, said method comprising the steps of:
    acquiring digital data representative of vibrations in said reversible drive;
    identifying portions of said data using a processor means; and
    grouping together said identified portions of data in a plurality of groups;
    wherein each of said identified portions of data relate to a particular direction of travel of said reversible drive and said plurality of groups relate to different directions of travel of said reversible drive;
    further comprising the step of processing at least one of said groups of identified portions of data to produce data representative of one or more vibration signatures;
    wherein said processing step comprises one or more steps selected from the group consisting of:
        accumulating the average, in the time domain, of the data comprising one of said groups;
        accumulating the average, in the angle domain, of the data comprising one of said groups;
        accumulating the average, in the frequency domain, of the data comprising one of said groups;
        accumulating the average, in the orders domain, of the data comprising one of said groups;
        computing a time synchronized average time waveform of the data comprising one of said groups;
        computing a frequency spectrum of a time synchronized average of the data comprising one of said groups;
        computing an order tracked frequency spectrum of the data comprising one of said groups;
        computing the kurtosis of an accumulated time domain average;
        computing the kurtosis of an accumulated angle domain average;
        computing the kurtosis of a time synchronized average time waveform; and
        computing a demodulated frequency spectrum of the data comprising one of said groups.

16. A method for detecting vibration signatures in a reversible drive, said method comprising the steps of:
    acquiring digital data representative of vibrations in said reversible drive;
    identifying portions of said data using a processor means; and
    grouping together said identified portions of data in a plurality of groups;
    wherein each of said identified portions of data relate to a particular direction of travel of said reversible drive and said plurality of groups relate to different directions of travel of said reversible drive;
    wherein grouping together identified portions of data relating to a particular direction of travel is done by appending successive portions to an accumulation of previous data portions also relating to the particular direction;
    wherein each successive sample of each of said one or more groups of identified portions of data corresponds to a successive sample position of said reversible drive.

17. A method for detecting vibration signatures in a reversible drive, said method comprising the steps of:
    acquiring digital data representative of vibrations in said reversible drive;
    identifying portions of said data using a processor means; and grouping together said identified portions of data in a plurality of groups;
wherein each of said identified portions of data relate to a particular direction of travel of said reversible drive and said plurality of groups relate to different directions of travel of said reversible drive;
wherein grouping together identified portions of data relating to a particular direction of travel is done by appending successive portions to an accumulation of previous data portions also relating to the particular direction;
wherein the reversible drive changes its direction of travel while the data is acquired.

18. A method for detecting vibration signatures in a reversible drive, said method comprising the steps of:
acquiring digital data representative of vibrations in said reversible drive;
identifying portions of said data using a processor means; and
grouping together said identified portions of data in a plurality of groups;
wherein each of said identified portions of data relate to a particular direction of travel of said reversible drive and said plurality of groups relate to different directions of travel of said reversible drive;
wherein each successive sample of each of said one or more groups of identified portions of data corresponds to a successive sample position of said reversible drive;
wherein the reversible drive changes its direction of travel while the data is acquired.

* * * * *